United States Patent
Katou

(10) Patent No.: US 9,016,865 B2
(45) Date of Patent: Apr. 28, 2015

(54) ILLUMINATION DEVICE AND PROJECTION TYPE DISPLAY DEVICE USING THE SAME

(75) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 430 days.

(21) Appl. No.: 13/500,286

(22) PCT Filed: Oct. 15, 2009

(86) PCT No.: PCT/JP2009/067849

§ 371 (c)(1),
(2), (4) Date: May 11, 2012

(87) PCT Pub. No.: WO2011/045857

PCT Pub. Date: Apr. 21, 2011

(65) Prior Publication Data

US 2012/0224146 A1   Sep. 6, 2012

(51) Int. Cl.
*G03B 21/14*   (2006.01)
*G03B 21/28*   (2006.01)
(Continued)

(52) U.S. Cl.
CPC  *G02B 6/24* (2013.01); *G03B 21/14* (2013.01); *F21V 9/14* (2013.01); *F21S 10/005* (2013.01);
(Continued)

(58) Field of Classification Search
CPC ......... G03B 21/14; F21V 9/14; F21S 10/005; H04N 9/3167; G02B 27/28; G02B 1/045; G02B 27/0994; G02B 6/10; G02B 6/24; G02F 1/0305; G02F 1/011
USPC .................................. 353/20, 98, 99; 385/11
See application file for complete search history.

(56) References Cited

U.S. PATENT DOCUMENTS 7,293,876 B2   11/2007   Takeda
2005/0213310 A1*   9/2005   Takeda ............................ 362/19

(Continued)

FOREIGN PATENT DOCUMENTS

CN   1673851 A   9/2005
JP   2000-206464 A   7/2000
(Continued)

OTHER PUBLICATIONS

International Search Report in PCT/JP2009/067849 dated Dec. 22, 2009(English Translation Thereof).
(Continued)

*Primary Examiner* — Toan Ton
*Assistant Examiner* — Magda Cruz
(74) *Attorney, Agent, or Firm* — McGinn IP Law Group, PLLC

(57) ABSTRACT

Illumination device includes a light source (101); an illumination optical system (102, 103, 104, 106, 107) that spatially splits each of the plurality of color light beams emitted from the light source, superimposes the split light beams of each of the plurality of color light beams, and emits the superimposed light beams to a display element (110); a reflective polarization plate (109) that is arranged between the illumination optical system (102, 103, 104, 106, 107) and the display element (110) and that transmits first polarized light and reflects second polarized light whose polarization state is different from that of the first polarized light toward the illumination optical system (102, 103, 104, 106, 107); a reflection element (105) that is arranged at a position where each of the plurality of color light beams is spatially split by the illumination optical system and that transmits the split light beams of each of the color light beams and reflects, of the split light beams of each of the color light beams that have been transmitted through the reflective polarization plate (109), each color light beam reflected by the reflective polarization plate toward the reflective polarization plate (109); and a phase plate (108) arranged between the reflection element (105) and the reflective polarization plate (109).

6 Claims, 15 Drawing Sheets

(51) Int. Cl.
    *G02B 6/00*    (2006.01)
    *G02B 6/24*    (2006.01)
    *F21V 9/14*    (2006.01)
    *F21S 10/00*   (2006.01)
    *H04N 9/31*    (2006.01)
    *G02B 27/28*   (2006.01)
    *G02B 1/04*    (2006.01)
    *G02B 27/09*   (2006.01)
    *G02B 6/10*    (2006.01)
    *G03B 33/06*   (2006.01)
    *G03B 21/20*   (2006.01)

(52) U.S. Cl.
    CPC .............. *H04N 9/3167* (2013.01); *G02B 27/28* (2013.01); *G02B 1/045* (2013.01); *G02B 27/0994* (2013.01); *G02B 6/10* (2013.01); *G03B 33/06* (2013.01); *G03B 21/2033* (2013.01); *G03B 21/2013* (2013.01); *G03B 21/2073* (2013.01)

(56) References Cited

U.S. PATENT DOCUMENTS

2005/0231654 A1* 10/2005 Hikspoors et al. ............... 349/5
2006/0077353 A1  4/2006  Wu
2006/0078266 A1  4/2006  Wu et al.
2007/0252504 A1  11/2007 Konno et al.
2007/0271003 A1  11/2007 Bang et al.

FOREIGN PATENT DOCUMENTS

| | | |
|---|---|---|
| JP | 2006-106682 A | 4/2006 |
| JP | 2006-106683 A | 4/2006 |
| JP | 2007-310866 A | 11/2007 |
| JP | 2008-065027 A | 3/2008 |
| JP | 2008-070529 A | 3/2008 |
| JP | 2009-003444 A | 1/2009 |

OTHER PUBLICATIONS

Hans Zou, et al, "Single-Panel LCoS Color Projector with LED Light Source," SID 05 Digest, pp. 1698-1701., 2005.

O.H. Willemsen, "A Handheld Mini-Projector Using LED Light Sources," SID 05 Digest, pp. 1706-1709., 2005.

Juan Maneul Teijido, et al., "Compact Three Panel LED Projector Engine for Portable Applications," SID 06 Digest, pp. 2011-2014, 2006.

Chinese Office Action dated Mar. 5, 2014, with English translation.

* cited by examiner

ILLUMINATION DEVICE AND PROJECTION TYPE DISPLAY DEVICE USING THE SAME

TECHNICAL FIELD

The present invention relates to an illumination device for a projection type display device represented by a liquid crystal projector, in particular, to an illumination device that illuminates a display element including a reflective polarization conversion element.

BACKGROUND ART

Patent Literatures 1 and 2 discuss a projector that uses a LED (Light Emitting Diode) as a light source for illuminating a DMD (Digital Micromirror Device) serving as a display element. The projector of this type is expected to reduce costs more than a projector that uses a discharge lamp, and achieve performance including miniaturization, lower power consumption, and a wider color reproduction range.

There are also a projector that uses a single LCoS (Liquid Crystal on Silicon) element (Nonpatent Literature 1), and a projector that users three liquid crystal panels as display elements (Nonpatent Literatures 2 and 3).

In the liquid crystal projector, usually, a liquid crystal panel must be illuminated with polarized light. Generally, light from the LED is unpolarized light. Thus, when the LED is used as a light source for illuminating the liquid crystal panel, it is preferable that the light from the LED be converted into polarized light to increase light use efficiency For example, when a display panel is a TN liquid crystal (Twisted Nematic Liquid Crystal) panel, with respect to the unpolarized light from the LED which includes two linear polarized components which are orthogonal each other, one of linear polarized component is converted to be similar to the other polarized component. When efficiency of this polarization conversion is low, the light use efficiency declines. When no polarization conversion is carried out, about a half of the light is not used as illumination light.

In the projector described in Nonpatent Literature 1, a luminous flux from the LED that is the light source is roughly converted into parallel luminous fluxes by a light guiding member having a composite parabolic surface shape, which is referred to as a CPC reflector. The display panel is illuminated with the parallel luminous fluxes from the light guiding member.

A quarter-wave plate and a reflective polarization plate are located in the traveling direction of the luminous flux from the light guiding member. For example, the polarization plate transmits p-polarized light while reflecting s-polarized light. The s-polarized light reflected by the polarization plate passes through the quarter-wave plate. The light (circular polarized light) passed through the quarter-wave plate returns to the LED to be reflected on a surface of the LED. The light reflected on the surface of the LED is converted parallel by the light guiding member, and then passes through the quarter-wave plate again.

A portion of the s-polarized light reflected by the polarization plate, which has passed through the quarter-wave plate twice in the returning process to the LED and in the process of being reflected on the surface of the LED to travel toward the polarization plate, is converted into p-polarized light.

In addition, there is an illuminating device discussed in Patent Literature 3. This illuminating device includes: a light source; a glass rod one end surface of which light from the light source enters; condensing means for condensing a luminous flux that has exited from the other end surface of the glass rod; and a PBS polarization conversion array disposed at a position where the condensing means forms a plurality of light source images.

The PBS polarization conversion array has first and second prisms that are arranged alternately in one direction. Each of the first and second prisms is a rectangular parallelepiped-shaped prism composed of two right-angled prisms that are adhered together.

The first prism includes a polarizing separation film formed on the bonded surface of the two right-angled prisms to transmit the p-polarized light while reflecting the s-polarized light, and is configured so that incident light can enter the polarizing separation film at an incident angle of about 45 degrees.

The second prism includes a reflection film formed on the bonded surface of the two right-angled prisms, and is configured so that the s-polarized light reflected by the polarizing separation film of the first prism can enter the reflection film at an incident angle of about 45 degrees. A surface of the second prism located in the traveling direction of the light reflected by the reflection film is an exit surface. A half-wave plate for converting the s-polarized light into p-polarized light is formed on the exit surface. A light shielding plate is formed on a surface opposite the exit surface of the second prism.

P polarized light that exits from the first prism travels in the same direction as does P polarized light that exits from the second prism. The condensing means is structured such that an image of the light source is formed on the incident plane of the first prism.

RELATED ART LITERATURE

Patent Literature

Patent Literature 1: JP2006-106683A
Patent Literature 2: JP2006-106682A
Patent Literature 3: JP2000-206464A

Non-Patent Literature

Non-patent Literature 1: "Single-Panel LCoS Color Projector with LED Light Source," SID 05 DIGEST, pp 1698-1701.
Non-patent Literature 2: "A Handheld Mini-Projector Using LED Light Sources," SID 05 DIGEST, pp 1706-1709.
Non-patent Literature 3: "Compact Three Panel LED Projector Engine for Portable Applications," SID 06 DIGEST, pp 2011-2014.

SUMMARY OF THE INVENTION

The projector presented in Non-patent Literature 1 however, has the following problem.

The light of the polarized component reflected by the reflective polarization plate efficiently returns to the surface of the LED. However, on the surface of the LED, only a part of the returned light is reflected toward the polarization plate. Thus, a light loss occurs on the surface of the LED, thus preventing realization of high polarizing conversion efficiency.

Since the illumination device presented in Patent Literature 3 uses a PBS polarization conversion array, it is difficult to miniaturize the illumination device. For example, since display panels have been miniaturized, the pitch of prisms of the PBS polarization conversion array may be required to be around 1 mm. If the first and second prisms are formed in such a pitch, it will be difficult to adhere the half-wave plate on the second prism.

Since it is expected that display panels will be further miniaturized, the requirement that the device use a miniaturized PBS polarization conversion array will become stronger in near future than the present time.

An object of the present invention is to provide a small illumination device and projection type display device that uses the illumination device that can solve the foregoing problems and improve polarization conversion efficiency and thereby light use efficiency.

To achieve the foregoing object, an illumination device according to the present invention includes:

a light source that emits a plurality of color light beams;

an illumination optical system that spatially splits each of the plurality of color light beams emitted from the light source, superimposes the split light beams of each of the plurality of color light beams, and emits the superimposed light beams to a display device;

a reflective polarization plate that is arranged between the illumination optical system and the display device and that transmits first polarized light and reflects second polarized light whose polarization state is different from that of the first polarized light toward the illumination optical system;

a reflection element that is arranged at a position where each of the plurality of color light beams is spatially split by the illumination optical system and that transmits the split light beams of each of the color light beams and that reflects, of the split light beams of each of the color light beams that have been transmitted through the reflective polarization plate, each color light beam reflected by the reflective polarization plate toward the reflective polarization plate; and a phase difference plate arranged between the reflection element and the reflective polarization plate, wherein the reflection element includes:

a first reflection member that transmits part of color light beams of the plurality of color light beams and reflects other than the transmitted part of color light beams; and a second reflection member that reflects the part of color light beams and transmits other than the transmitted part of color light beams.

A projection type display device according to the present invention comprises:

an illumination device;

a display device illuminated with light emitted from the illumination device; and a projection optical system that projects image light that is output from the display device, wherein the illumination device, including:

a light source that emits a plurality of color light beams;

an illumination optical system that spatially splits each of the plurality of color light beams emitted from the light source, superimposes the split light beams of each of plurality of color light beams, and emits the superimposed light beams to a display device;

a reflective polarization plate that is arranged between the illumination optical system and the display device and that transmits first polarized light and that reflects second polarized light whose polarization state is different from that of the first polarized light toward the illumination optical system;

a reflection element that is arranged at a position where each of the plurality of color light beams is spatially split by the illumination optical system and that transmits the split light beams of each of the color light beams and that reflects, of the split light beams of each of the color light beams that have been transmitted through the reflective polarization plate, each color light beam reflected by the reflective polarization plate toward the reflective polarization plate; and a phase difference plate arranged between the reflection element and the reflective polarization plate, wherein the reflection element includes:

a first reflection member that transmits part of color light beams of the plurality of color light beams and reflects other than the transmitted part of color light beams; and a second reflection member that reflects the part of color light beams and transmits other than the transmitted part of color light beams.

DESCRIPTION OF REFERENCE NUMERALS

Figure 1:
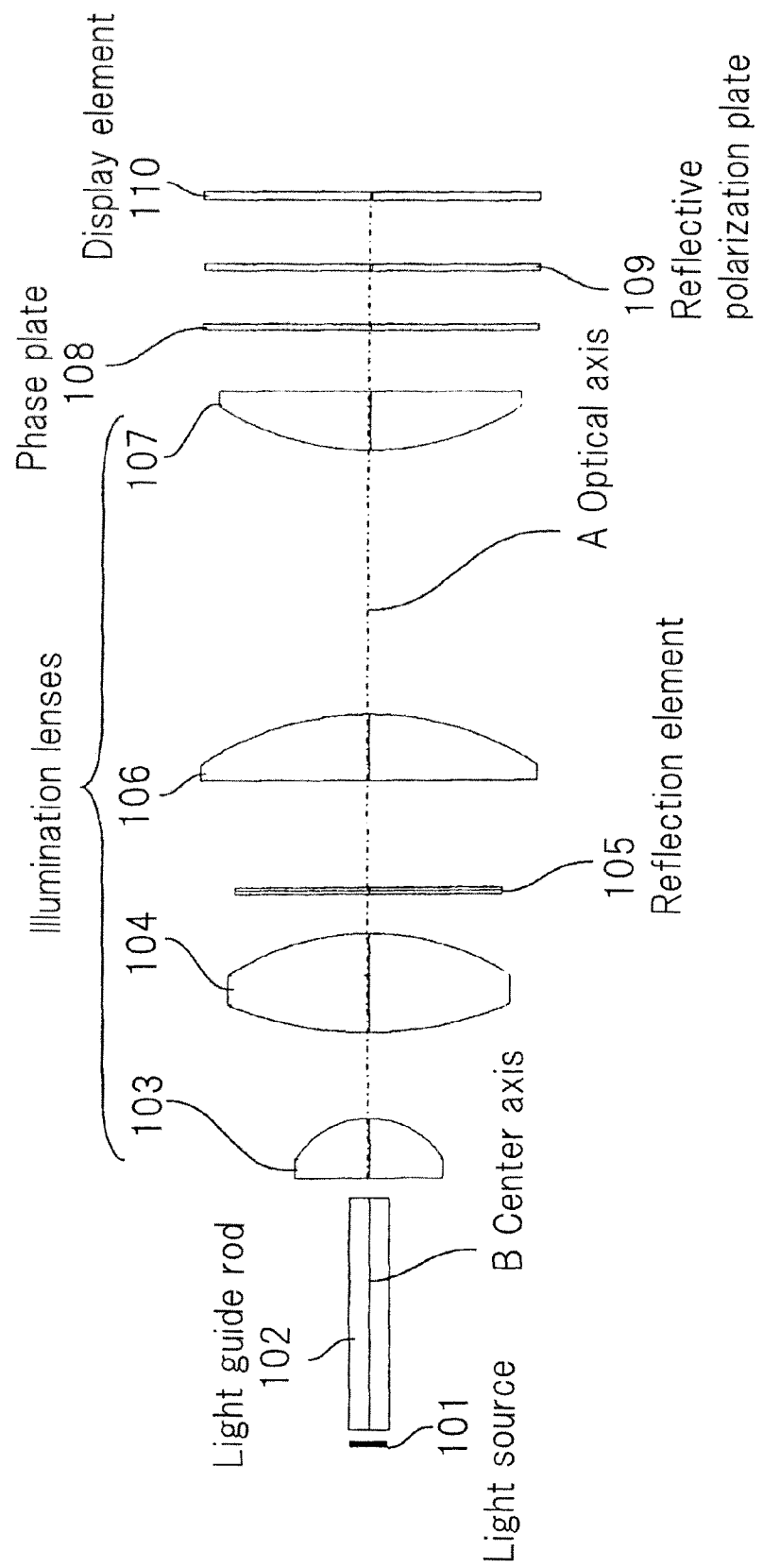
FIG. 1 is a schematic diagram showing the structure of illumination device according to an exemplary embodiment of the present invention.

101 Light source
102 Light guide rod
103, 104, 106, 107 Illumination lenses
105 Reflection element
108 Phase plate
109 Reflective polarization plate
110 Display device

BEST MODES THAT CARRY OUT THE INVENTION

Next, with reference to the accompanying drawings, embodiments of the present invention will be described.

(First Exemplary Embodiment)

FIG. 1 is a schematic diagram showing the structure of illumination device according to an exemplary embodiment of the present invention.

As shown in FIG. 1, the illumination device according to the present embodiment, which illuminates display element 110 having reflective polarizing plate 109, includes, in addition to reflective polarizing plate 109, light source 101, light guiding rod 102, illumination lenses 103, 104, 106, and 107, reflection element 105, and phase plate 108.

Reflective polarization plate 109 is, for example, a polarization plate of a wire-grid type, and configured to transmit, among incident lights, first polarized light (e.g., P polarized light) while reflecting second polarized light (e.g., S polarized light) in a polarization state that is different from the polarization state of the first polarized light in a direction (toward reflection element 105) opposite an incident direction.

Display element 110 includes, for example, a liquid crystal panel. For both reflective polarizing plate 109 and display element 110, commercially available products can be used. As display element 110, for example, a transmission type liquid crystal panel having a diagonal of 1.0 inch can be used.

Reflective polarization plate 109 is preferably arranged in the neighborhood of the display plane (panel plane) of display element 110. Alternatively, reflective polarization plate 109 may be integrally formed together with display element 110. For example, when display element 110 is a liquid crystal panel, reflective polarization plate 109 may be integrally formed together with an incident side substrate of the liquid crystal panel.

Light source 101 is composed of a solid light source typified by for example an LED. Specifically, light source 101 is an LED module composed of a plurality of LEDs that emit color light beams having different wavelengths.

Figure 2:
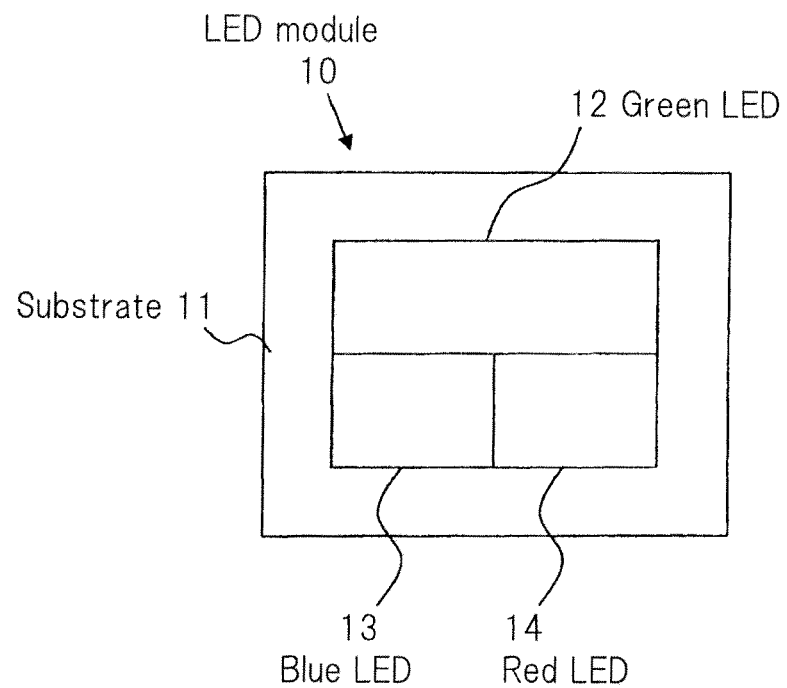
FIG. 2 is a schematic diagram showing the structure of a light source of the illumination device shown in FIG. 1.

FIG. 2 shows the structure of the LED module that is an example of light source 101. Referring to FIG. 2, LED module 10 includes green LED 12, blue LED 13 and red LED 14 which are formed on substrate 11. Green LED 12 has a rectangular light emitting section with a size of 3 mm×8 mm. Alternatively, green LED 12 may be composed of two green LEDs each of which has a light emitting section with a size of 3 mm×4 mm.

Blue LED 13 and red LED 14 each have a rectangular light emission section with a size of 3 mm×x 4 mm. The individual light emitting sections of these green LED 12, blue LED 13, and red LED 14 are adjacently arranged and the entire size of these light emission sections is 6 mm×8 mm.

Light source 101 is arranged such that the individual light emission sections comprising green LED 12, blue LED 13, and red LED 14 shown in FIG. 2 face a first plane (incident plane) of light guide rod 102. Light emitted from the individual light emission sections comprising green LED 12, blue LED 13, and red LED 14 enters the incident plane of light guide rod 102. The incident plane has regions that light emitted from each light emission section enters.

Figure 3A:
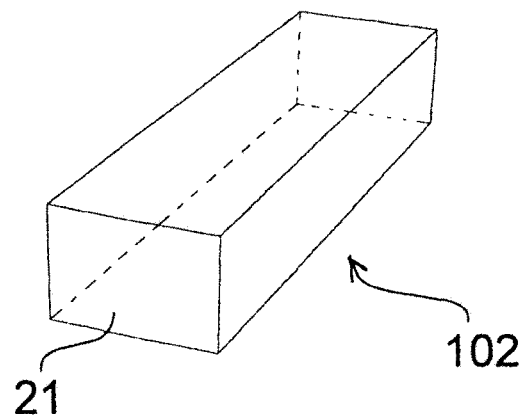
FIG. 3A is a perspective view showing a light guide rod of the illumination device shown in FIG. 1.
Figure 3B:
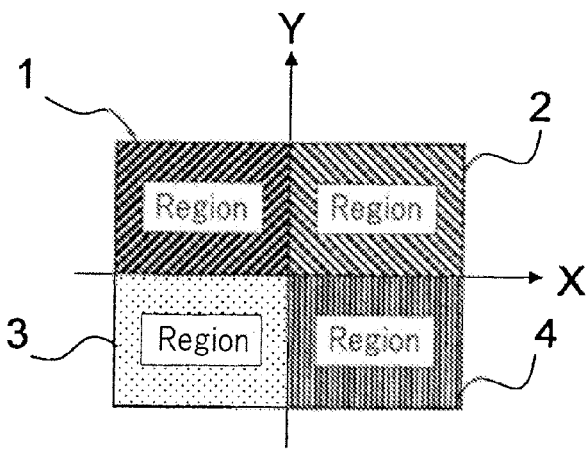
FIG. 3B is a schematic diagram showing an example in which an incident plane of the light guide rod of the illumination device shown in FIG. 1 is segmented.

FIG. 3A schematically shows light guide rod 102. FIG. 3B schematically shows regions that are arranged on the incident plane of light guide rod 102 and that light emitted from each light emission section of green LED 12, blue LED 13, and red LED 14 enters.

As shown in FIG. 3A, light guide rod 102 is composed of a rectangular parallelepiped-shaped rod having a cross section with a size of 8 mm×6 mm and a length of 20 mm. As shown in FIG. 3B, the incident plane of light guide rod 102 is segmented into four regions 1 to 4 by first and second orthogonal straight lines that pass through the center (median point) of the incident plane. Each of these regions has a size of 3 mm×4 mm. In FIG. 3B, the first and second straight lines correspond to straight lines that represent the Y axis and X axis, respectively.

Green LED 12 is arranged such that its light emission section faces regions 1 and 2. Blue LED 13 is arranged such that its light emission section faces region 4. Red LED 14 is arranged such that its light emission section faces region 3.

Figure 3C:
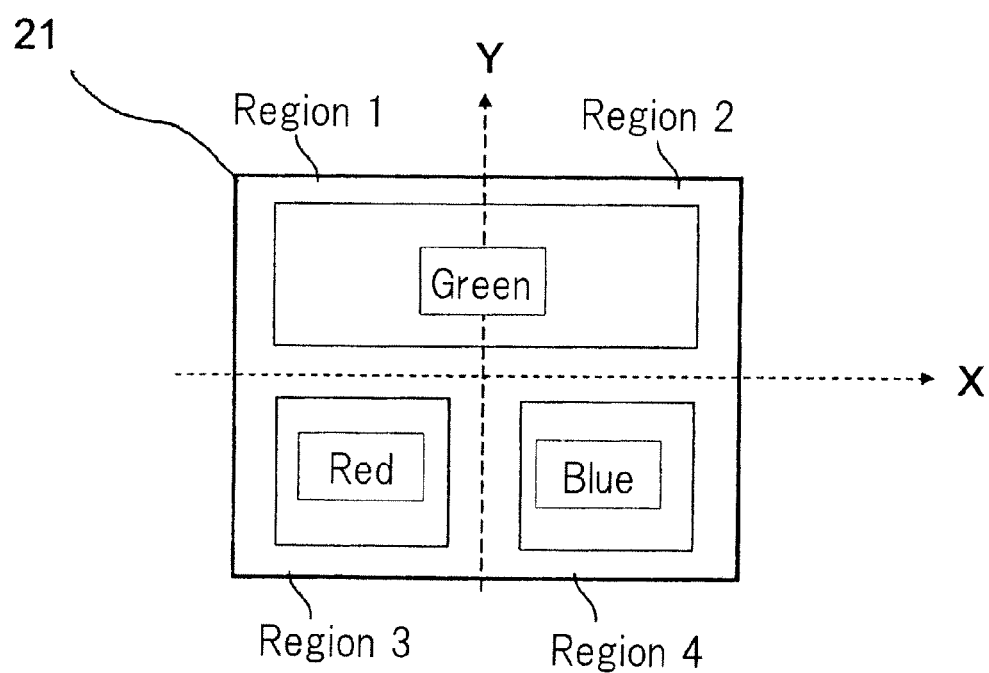
FIG. 3C is a schematic diagram showing the relationship between the individual regions of the incident plane of the light guide rod shown in FIG. 3B, a green LED, a blue LED, and a red LED.

FIG. 3C schematically shows the relationship between green LED 12, blue LED 13, red LED 14, and individual regions of incident plane 21 of light guide rod 102. As shown in FIG. 3C, light emitted from green LED 12 enters regions 1 and 2; light emitted from blue LED 13 enters region 4; and light emitted from red LED 14 enters region 3.

Light guide rod 102 may be composed of BK7 that is made of glass and is inexpensive. Besides optical glass, light guide rod 102 may be made of optical plastic. Light guide rod 102 may be of hollow type or solid type having no hollow portion.

The distance between the individual light emission sections and regions 1 to 4 are preferably as short as possible so that light emitted from the individual light emission sections comprising green LED 12, blue LED 13, and red LED 14 securely enters regions 1 to 4.

Arranged successively in the traveling direction of light that exits from a second plane (exit plane) of light guide rod 102 are illumination lenses 103 and 104, reflection element 105, illuminance lenses 106 and 107, phase plate 108, reflective polarization plate 109, and display element 110.

Formed on the exit plane of light guide rod 102 are optical images corresponding to the individual light emission sections comprising green LED 12, blue LED 13, and red LED 14. The individual optical images are focused on the display plane of display element 110 by illumination lenses 103, 104, 106, and 107. Although illumination lenses 103, 104, 106, and 107 are plano-convex lenses or bi-convex lenses, they may be concave lenses.

Optical axis (common axis) A of the system including illumination lenses 103, 104, 106, and 107 matches the center axis B that passes through the center (median point) of the section of light guide rod 102. With respect to reflection element 105, phase plate 108, reflective polarization plate 109, and display element)10, theses centers (median points) lie on optical axis A.

A green light beam, which is emitted from green LED 12 and enters regions 1 and 2 of the incident plane of light guide rod 102, is reflected on the inner planes of light guide rod 102, and then exits from the exit plane of light guide rod 102 to travel toward illumination lens 103. A blue light beam, which is emitted from blue LED 13 and enters region 4 of the incident plane of light guide rod 102, is reflected on the inner planes of light guide rod 102, and then exits from the exit plane of light guide rod 102 to travel toward illumination lens 103. A red light beam, which is emitted from red LED 14 and enters region 3 of the incident plane of light guide rod 102, is reflected on the inner planes of light guide rod 102, and then exits from the exit plane of light guide rod 102 to travel toward illumination lens 103.

Each of the green, blue, and red light beams that exit from the exit plane of light guide rod 102 is spatially split into a plurality of light beams by illumination lenses 103 and 104. The number of light beams into which each of green, blue, and red light beams is split depends on the number of times that the light is reflected on the inner planes of light guide rod 102. Illumination lenses 106 and 107 superimpose the plurality of light beams of each color spatially split and illuminate display element 110 with the superimposed light beams.

In other words, light guide rod 102 and illumination lenses 103, 104, 106, and 107 form an illumination optical system that splits a light beam of each color emitted from light source 101 into a plurality of light beams, superimposes the plurality of light beams of each color that has been split, and illuminates display element 110 with the superimposed light beam.

Reflection element 105, which reflects light from reflective polarization plate 109 to the direction of reflective polarization plate 109, is arranged at the position where each of green, blue, and red light beams that exit from the exit plane of light guide rod 102 is spatially split. For example, reflection element 105 is arranged between illumination lens 104 and illumination lens 106.

Figure 4A:
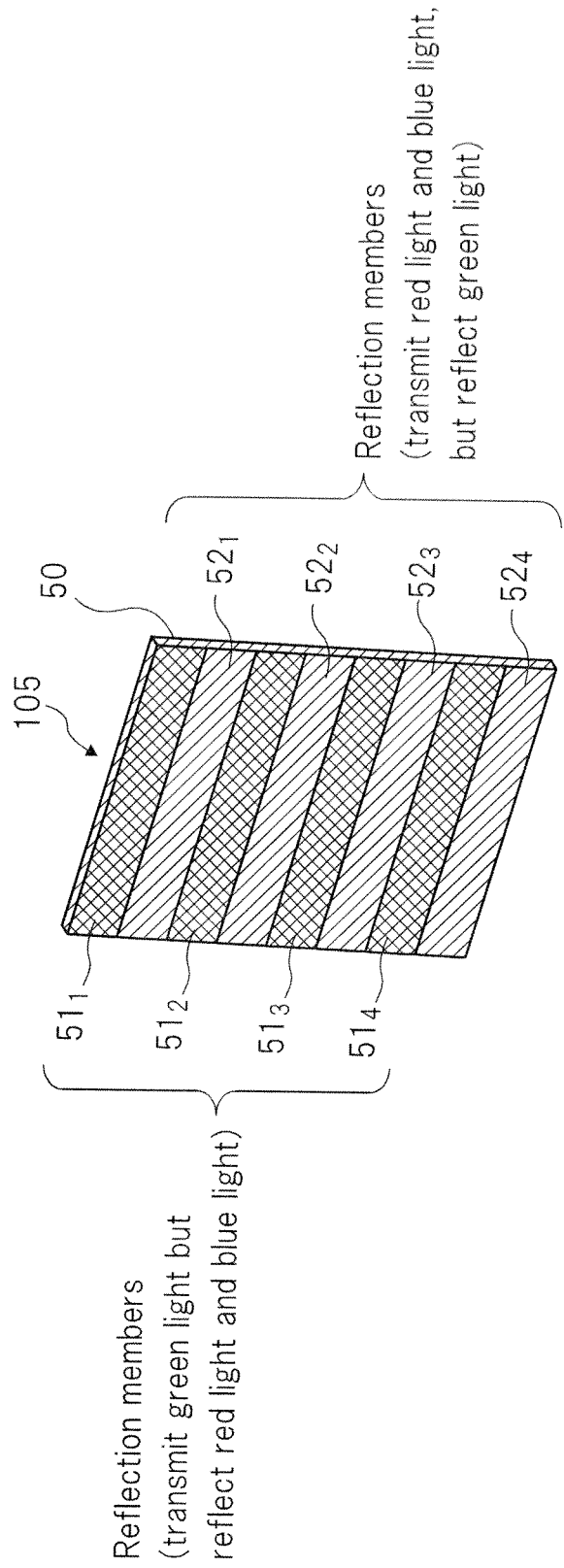
FIG. 4A is a perspective view showing a reflection element of the illumination device shown in FIG. 1.
Figure 4B:
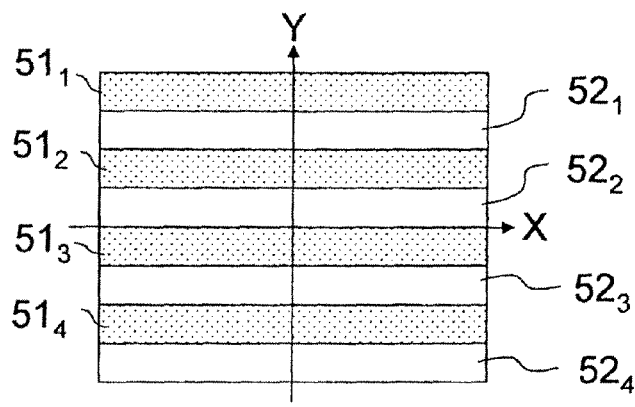
FIG. 4B is a plan view showing the reflection element of the illumination device shown in FIG. 1.

FIG. 4A is a perspective view showing reflection element 105 and FIG. 4B is a plan view showing reflection element 105. Referring to FIG. 4A and FIG. 4B, reflection element 105 is composed of a plurality of stripe-shaped reflection members $51_1$ to $51_4$ and $52_1$ to $52_4$ that are formed on glass substrate 50 having a thickness of around 1 mm by an aluminum vapor deposition treatment. Reflection members $51_1$ to $51_4$ and $52_1$ to $52_4$ may be dielectric polymers.

A green light beam that exits from the exit plane of light guide rod 102 is spatially split by illumination lenses 103 and 104 and then the split light beams enter reflection members $51_1$ to $51_4$. A red light beam that exits from the exit plane of light guide rod 102 is spatially split by illumination lenses 103 and 104 and then the split light beams enter reflection members $52_1$ to $52_4$. Likewise, a blue light beam that exits from the exit plane of light guide rod 102 is specially split by illumination lenses 103 and 104 and then the split light beams enter reflection members $52_1$ to $52_4$.

Figure 5:
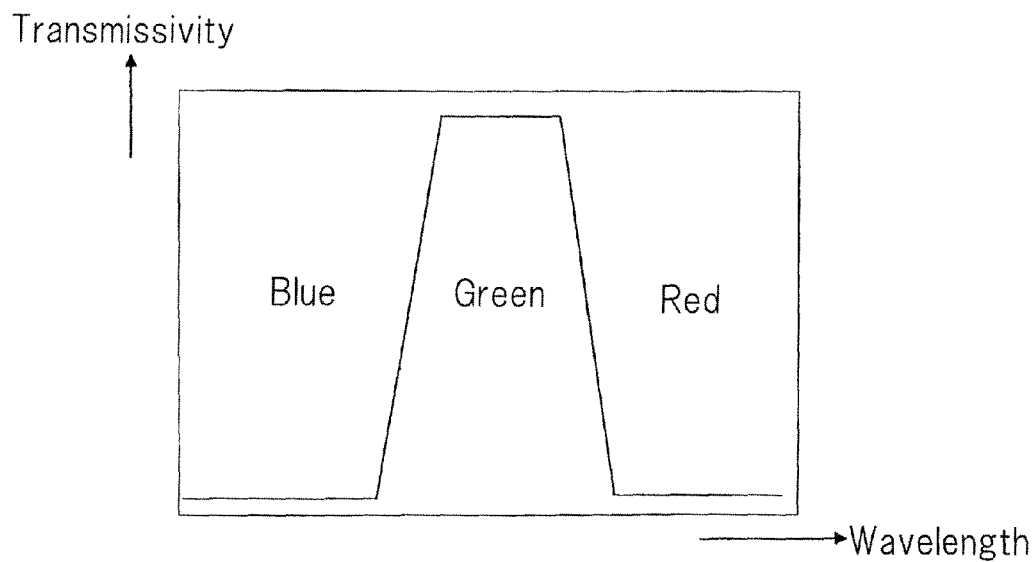
FIG. 5 is a characteristic diagram showing spectroscopic transmission characteristics of a first reflection film formed on the reflection element shown in FIG. 4A.

FIG. 5 shows spectroscopic transmission characteristics of reflection members $51_1$ to $51_4$. In FIG. 5, the vertical axis represents transmissivity and the horizontal axis represents wavelength. As shown in FIG. 5, reflection members $51_1$ to $51_4$ have characteristics in which they transmit light having a green wavelength band and reflect light of red and blue wavelength bands.

Figure 6:
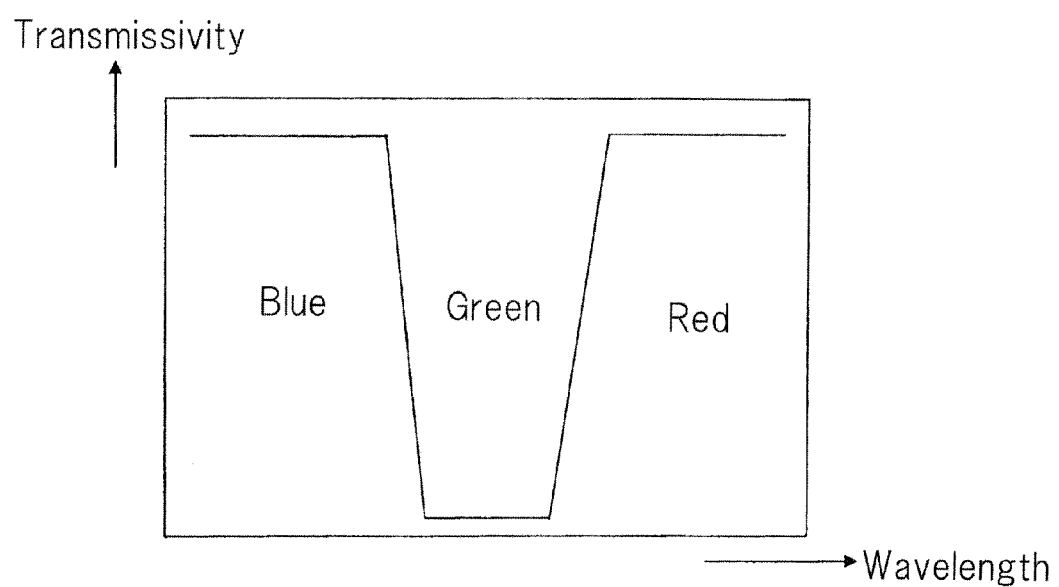
FIG. 6 is a characteristic diagram showing spectroscopic transmission characteristics of a second reflection film formed on the reflection element shown in FIG. 4A.

FIG. 6 shows spectroscopic transmission characteristics of reflection members $52_1$ to $52_4$. In FIG. 6, the vertical axis represents transmissivity, whereas the horizontal axis represents wavelength. As shown in FIG. 6, reflection members $52_1$ to $52_4$ have characteristics in which they transmit light having red and blue wavelength bands and reflect light of a green wavelength band.

As shown in FIG. 4B, reflection members $51_1$ to $51_4$ and reflection members $52_1$ to $52_4$ are successively arranged in the direction of the Y axis. When viewed from the direction perpendicular to the incident plane of light guide rod 102, the direction of the Y axis shown in FIG. 3B matches the direction of the Y axis shown in FIG. 4B. The median point of reflection element 105 (corresponding to the intersection of the X axis and the Y axis of FIG. 4B) lies at the center of the boundary of reflection member $51_3$ and reflection member $52_2$ and this median point lies on optical axis A.

A plurality of optical images (imaginary images) of the exit plane of light guide rod 102 are formed at the position of reflection element 105. Individual optical images formed at the position of reflection element 105 correspond to split light beams of individual colors of red, green, and blue and these images have a width of around 5 mm in their vertical direction (the direction of the Y axis of FIG. 4B). Optical images corresponding to red and blue light beams are formed on reflection members $52_1$ to $52_4$ of reflection element 105. Optical images corresponding to green light beams are formed on reflection members $51_1$ to $51_4$ of reflection element 105.

A plurality of optical images (imaginary images) are formed at the position of reflection element 105 corresponding to images formed on reflective polarization plate 109 (images corresponding to optical images of individual colors of red, green, and blue on the exit plane of light guide rod 102) by second polarized light. Individual optical images formed at the position of reflection element 105 correspond to individual split light beams of individual colors of red, green, and blue and these images have a width of around 5 mm in their vertical direction (the direction of the Y axis of FIG. 4B). Optical images corresponding to red and blue light beams are formed on any one of reflection members $51_1$ to $51_4$ of reflection element 105. Optical images corresponding to green light beams are formed on any one of reflection members $52_1$ to $52_4$ of reflection element 105.

Each of reflection members $51_1$ to $51_4$ and $52_1$ to $52_4$ has a width of around 5 mm corresponding to the foregoing optical images (imaginary images). The reflection members formed on reflection element 105 are not limited to those shown in FIG. 4A and FIG. 4B. The number of reflection members formed on reflection element 105 and their width depend on the number of light beams split from each light beam that exits from the exit plane of light guide rod 102 and the size of each light beam.

Phase plate 108 is a ¼-wavelength plate and is arranged between illumination lens 107 and reflective polarization plate 109. Alternatively, phase plate 108 may be arranged at any position as long as it is arranged between reflection element 105 and reflective polarization plate 109.

In the structure shown in FIG. 1, phase plate 108 is provided independently from other members. Alternatively, phase plate 108 may be adhere to the plane side of illumination lens 107 that is the plano-convex lens, the plane side facing display element 110. This structure allows a glass substrate to be used in common, resulting in reducing the number of constituent members of the illumination device.

Alternatively, phase plate 108 may be integrally formed together with reflection element 105. For example, phase difference plate 108 may be adhere to the opposite plane of the reflection member plane (on which reflection members $51_1$ to $51_4$ and $52_1$ to $52_4$ are formed) of glass substrate 50 shown in FIG. 4A. Likewise, this structure allows the number of constituent members of the illumination device to be reduced.

In the illumination device shown in FIG. 1, the illumination lens group, which forms an illumination optical system, includes four illumination lenses 103, 104, 106, and 107. Alternatively, the illumination lens group may be composed of any lens structure as long as it can focus optical images formed on the exit plane of light guide rod 102 on the display plane of display element 110.

More preferably, the optical parameters (the relationship between radius of curvature, interval, and optical axis) regarding illumination lenses 103, 104, 106, and 107 need to satisfy the following two conditions.

The first condition is to focus optical images formed on the exit plane of light guide rod 102 on the display plane of display element 110.

The second condition is to spatially split, into a plurality of light beams, each of light beams of colors of red, green, and blue output from the exit plane of light guide rod 102 and to return, at the split position, the reflected light from reflective polarization plate 109 to regions that are arranged between the split light beams.

Next, the operation of the illumination device according to this embodiment will be described in detail.

Figure 7:
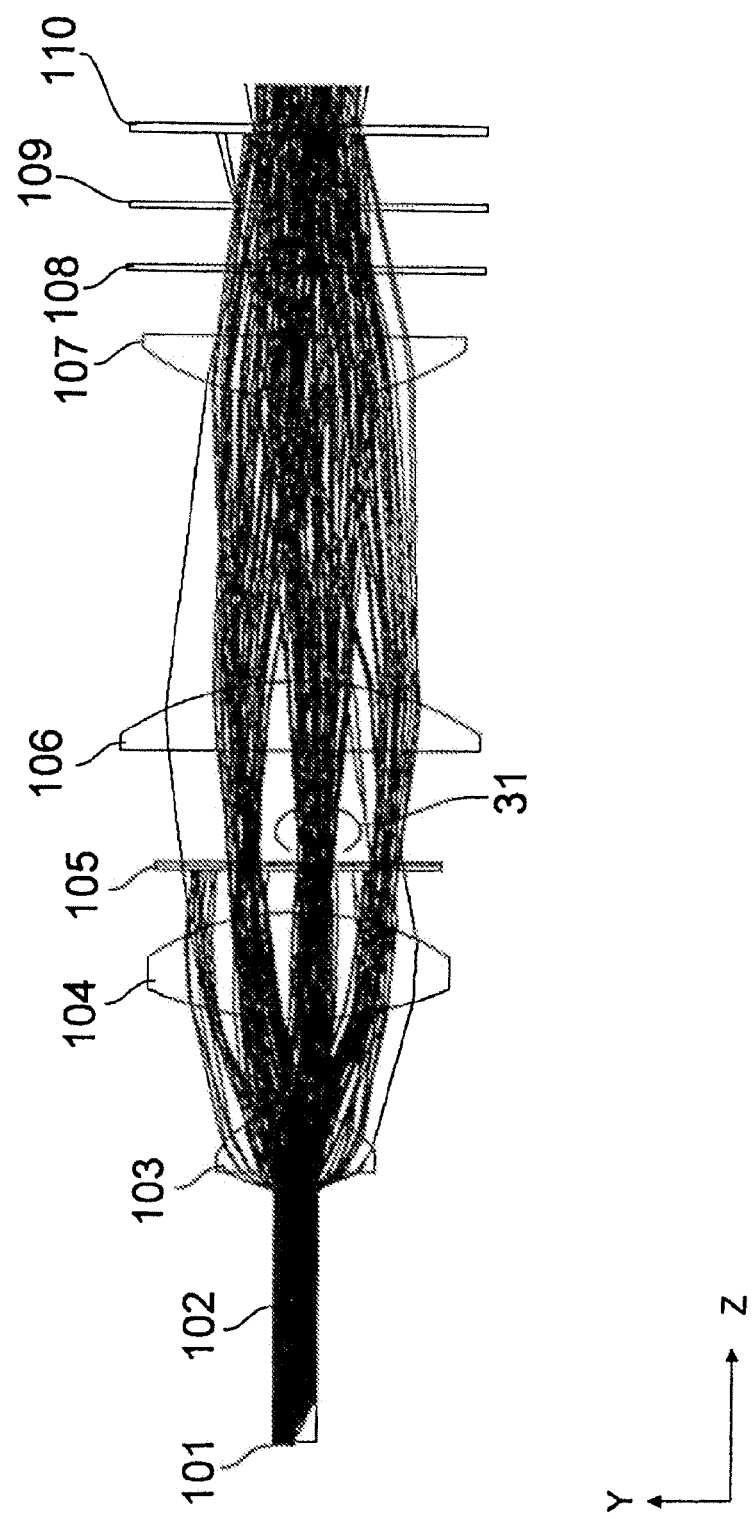
FIG. 7 is a schematic diagram showing a ray tracing result for optical paths after a light beam is emitted from the green LED of the illumination device shown in FIG. 1 until the light beam reaches the display device.

(1) Operation of a Green Light Beam Emitted from Green LED 12 of Light Source 101:

FIG. 7 is a schematic diagram showing a ray tracing result for optical paths after a light beam is emitted from green LED 12 until it reaches display element 110. In FIG. 7, the Y axis is a direction perpendicular to optical axis A and corresponds to the vertical direction of images formed on the display plane (panel plane) of display element 110. The Z axis corresponds to a direction along optical axis A.

Referring to FIG. 7, a non-polarized green light beam that is emitted from green LED 12 enters regions 1 and 2 of the incident plane of light guide rod 102 shown in FIG. 3B. In FIG. 7, regions 1 and 2 lie above the center axis B of light guide rod 102.

Green light that enters light guide rod 102 is repeatedly reflected on the inner planes of light guide rod 102 while the light is propagating and finally reaches the exit plane of light guide rod 102. During the propagation of the light in light guide rod 102, the illuminance of the light is equalized. Even if the illuminance of light emitted from green LED 12 is irregular, since light guide rod 102 equalizes the illuminance, the illuminance of light that exits from the exit plane of light guide rod 102 is equally distributed.

Illumination information (square green light source image) formed on the exit plane of light guide rod 102 is focused on the display plane (panel plane) of display element 110 by the illumination lens group composed of illumination lenses 103, 104, 106, and 107.

The non-polarized green light beam that exits from the exit plane of light guide rod 102 is spatially split into a plurality of light beams by illumination lenses 103 and 104. The number of light beams split by illumination lenses 103 and 104 depends on the number of times that the light is reflected during the propagation of light in light guide rod 102.

In FIG. 7, the non-polarized green light beam that exits from light guide rod 102 is split into three light beams. In consideration of split light beam 31 whose ray height that represents the height from optical axis A (the ray height is the height in the direction of the Y axis) is minimal, it is clear that split light beam 31 does not lie on optical axis A. This results from the fact that since the region of the incident plane of light guide rod 102, into which the non-polarized green light beam that is emitted from green LED 12 enters, lies above the center axis B of light guide rod 102, split light beam 31 enlarges while it varies with respect to optical axis A as shown in FIG. 3B.

Reflection element 105 is arranged such that each of green light beams split by illumination lenses 103 and 104 is transmitted through any one of reflection members $51_1$ to $51_4$. For example, split light beam 31 transmits through reflection member $51_3$. Each of split green light beams passes through reflection element 105 without hardly any optical loss due to shielding caused by reflection members $52_1$ to $52_4$.

Each of split green light beams that have passed through reflection element 105 is superimposed by illumination lenses 106 and 107 and then reaches reflective polarization plate 109 through phase plate 108.

Although reflective polarization plate 109 transmits first linearly polarized light (for example, P polarized light) of light beams (non-polarized light) that have passed through phase plate 108, reflective polarization plate 109 reflects second linearly polarized light (for example, S polarized light) of the light beams in the direction of phase plate 108.

The first linedrly polarized light that was transmitted through reflective polarization plate 109 reaches the display plane (panel plane) of display element 110. Display element 110 is illuminated with the first linearly polarized light of the superimposed green light beam of split green light beams superimposed by illumination lenses 106 and 107. As a result, a green illumination light beam having an equal illuminance distribution can be provided.

On the other hand, the second linearly polarized light (S polarized light) reflected by reflective polarization plate 109 passes through phase plate 108 and then reaches any one of reflection members $52_1$ to $52_4$ of reflection element 105 through illumination lenses 106 and 107. Any one of reflection members $52_1$ to $52_4$ of reflection element 105 reflect the green light beams (S polarized light) that have passed through reflective polarization plate 109 to the direction of reflective polarization plate 109.

Figure 8:
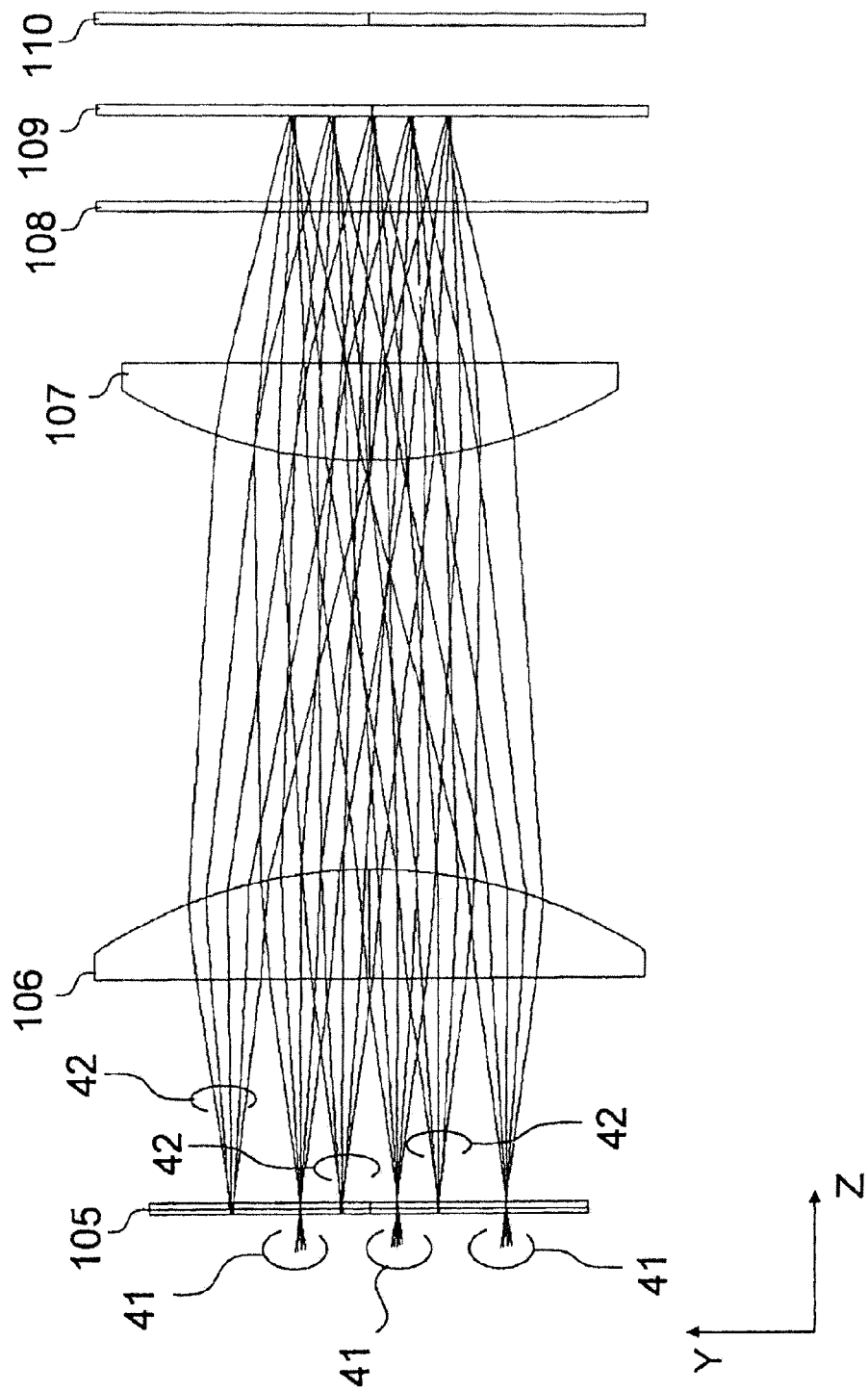
FIG. 8 is a schematic diagram showing a ray tracing result for optical paths after split green light beams that have been transmitted through the reflection element of the illumination device shown in FIG. 1 are reflected by a reflective polarization plate until the light beams return to the reflection element.

FIG. 8 is a schematic diagram showing a ray tracing result for optical paths after split green light beams that have been transmitted through reflection element 105 are reflected by reflective polarization plate 109 until the light beams return to reflection element 105. In FIG. 8, green rays that have been transmitted through particular regions (points) on reflection members $51_2$, $51_3$, and $51_4$ of reflection element 105 shown in FIG. 4A and FIG. 4B are denoted by rays 41. In FIG. 8, the Y axis is a direction perpendicular to optical axis A and corresponds to the vertical direction of images formed on the display plane (panel plane) of display element 110. The Z axis corresponds to a direction along optical axis A.

Green rays 41 that have passed through reflection element 105 successively pass through illumination lenses 106 and 107 and phase plate 108 and then reach reflective polarization plate 109. Green rays 41 are non-polarized light when they have just passed through reflection element 105 and after they have passed through phase plate 108.

The first linearly polarized light, of green rays 41 that have passed through phase plate 108, is transmitted through reflective polarization plate 109, whereas the second linearly polarized light is reflected by reflective polarization plate 109 in the direction of phase plate 108.

The second linearly polarized light of green rays reflected by reflective polarization plate 109 passes through phase plate 108, becomes circularly polarized light, and then reaches illumination lens 107. Rays (circularly polarized light) that have passed through phase plate 108 are condensed by illumination lenses 106 and 107 on reflection members $52_1$, $52_2$, and $52_3$ of reflection element 105 shown in FIG. 4A and FIG. 4B. The condensed rays are rays 42.

When viewed from a direction perpendicular to the incident plane (or exit plane) of reflection element 105 (in the direction of optical axis A), the positions on reflection members $51_2$, $51_3$ through which rays 41 transmit and $51_4$ and the positions on reflection members $52_1$, $52_2$, and $52_3$ to which rays 42 are illuminated are point-symmetrical with respect to optical axis A.

In reflection element 105, reflect rays 42 are reflected by reflection members $52_1$, $52_2$, and $52_3$ in the direction of reflective polarization plate 109. Light beams (circularly polarized light) reflected by reflection members $52_1$, $52_2$, and $52_3$ successively pass through illumination lenses 106 and 107 and phase plate 108 and then reach reflective polarization plate 109.

The reflected light beams (circularly polarized light) from reflection element 105 are converted into first polarized light (P polarized light) by phase plate 108. The first polarized light (P polarized light) from phase plate 108 is transmitted through reflective polarization plate 109 and then reaches display element 110.

Figure 9:
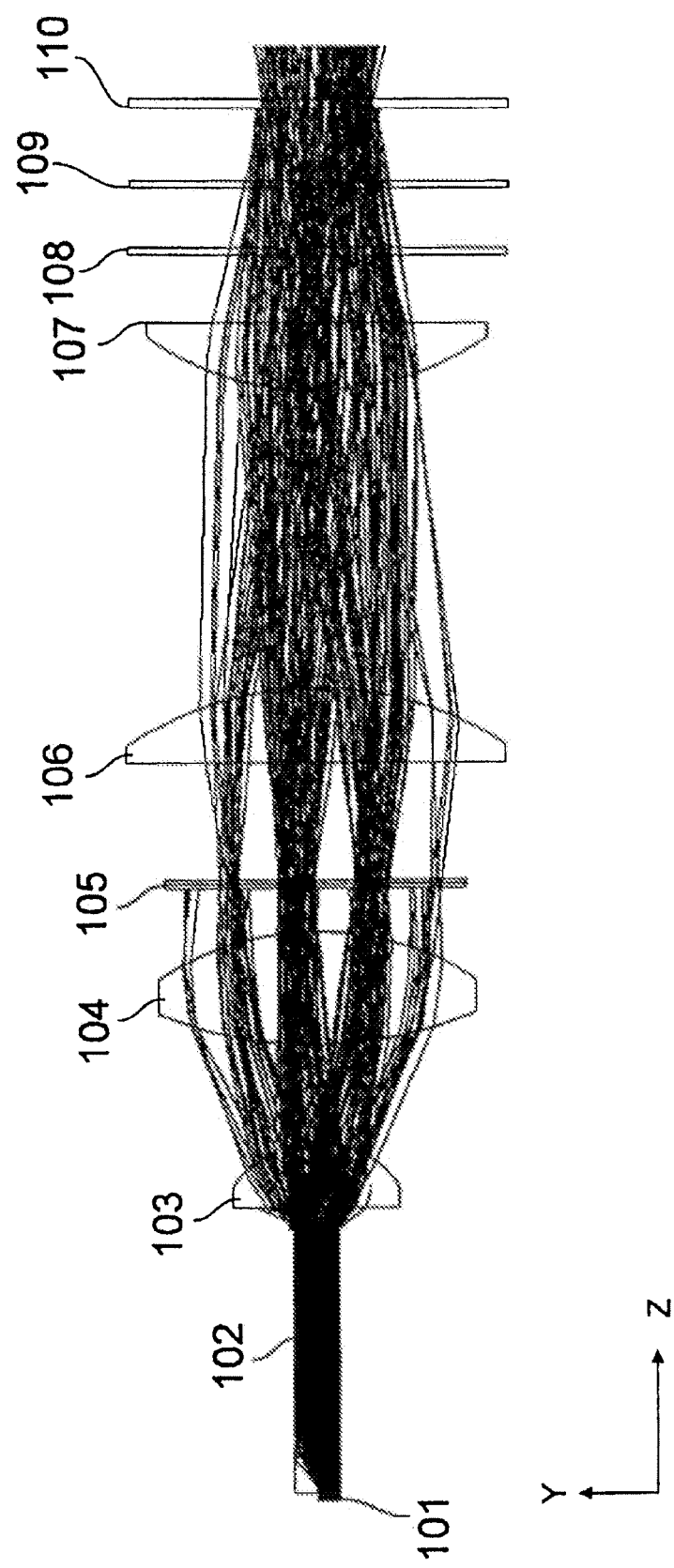
FIG. 9 is a schematic diagram showing a ray tracing result for optical paths after light beams are emitted from the blue LED and the red LED of the illumination device shown in FIG. 1 until the light beams reaches the display device.

(2) Operation of Blue and Red Light Beams Respectively Emitted from Blue LED 13 and Red LED 14 of Light Source 101:

FIG. 9 is a schematic diagram showing a ray tracing result for optical paths after light beams are emitted from blue LED 13 and red LED 14 until the light beams reach display element 110. In FIG. 9, the Y axis is a direction perpendicular to optical axis A and corresponds to the vertical direction of images formed on the display plane (panel plane) of display element 110. The Z axis corresponds to a direction along optical axis A. In FIG. 9, red LED 14 is arranged on the far side of the drawing, whereas blue LED 13 is arranged on the near side of the drawing. In the example shown in FIG. 9, a light beam emitted from blue LED 13 is overlapped with a light beam emitted from red LED 14.

Figure 10:
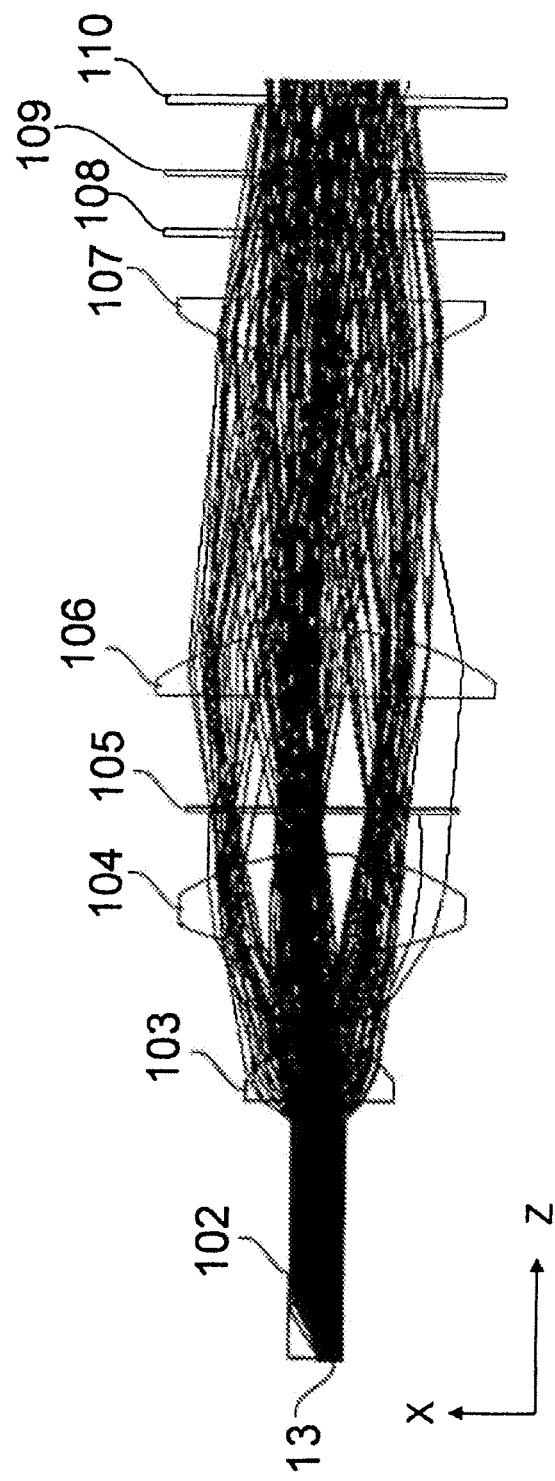
FIG. 10 is a schematic diagram showing a ray tracing result for optical paths after a light beam is emitted from the blue LED of the illumination device shown in FIG. 1 until the light beam reaches the display device.

FIG. 10 is a schematic diagram showing a ray racking result for optical paths after a light beam is emitted from blue LED 13 until the light beam reaches display element 110. In FIG. 10, the X axis is a direction perpendicular to the Y axis shown in FIG. 9 and corresponds to the horizontal direction of images formed on the display plane (panel plane) of display element 110. The Z axis corresponds to a direction along optical axis A.

Figure 11:
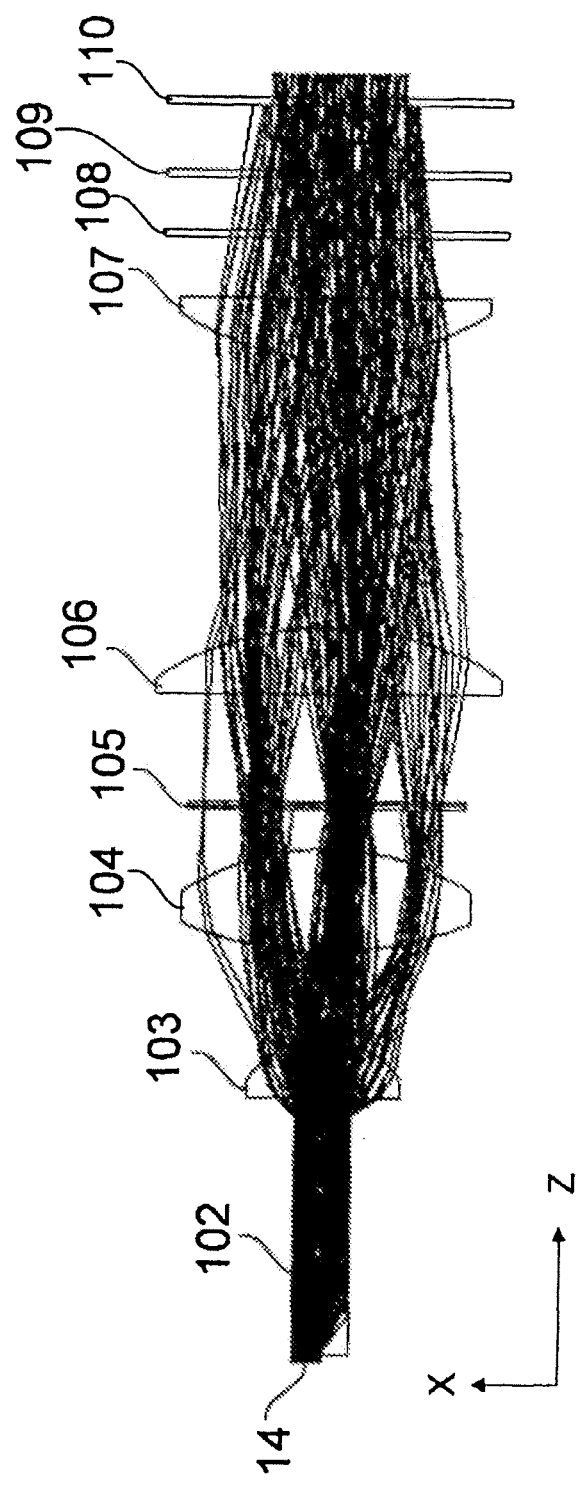
FIG. 11 is a schematic diagram showing a ray tracing result for optical paths after a light beam is emitted from the red LED of the illumination device shown in FIG. 1 until the light beam reaches the display device.

FIG. 11 is a schematic diagram showing a ray tracing result for optical paths after a light beam is emitted from red LED 14 until the light beam reaches display element 110. In FIG. 11, the X axis is a direction perpendicular to the Y axis shown in FIG. 9 and corresponds to the horizontal direction of images formed on the display plane (panel plane) of display element 110. The Z axis corresponds to a direction along optical axis A.

Referring to FIG. 9 and FIG. 10, a blue light beam of non-polarized light emitted from blue LED 13 enters region 4 of the incident plane of light guide rod 102 shown in FIG. 3B. In FIG. 9, region 3 lies below the center axis of light guide rod 102.

Blue light that enters light guide rod 102 is repeatedly reflected on the inner planes of light guide rod 102 while the light is propagating and finally reaches the exit plane of light guide rod 102. During the propagation of the light in light guide rod 102, the illuminance of the light is equalized. Even if the illuminance of light emitted from blue LED 13 is irregular, since light guide rod 102 equalizes the illuminance, the illuminance of light that exits from the exit plane of light guide rod 102 is equally distributed.

Illumination information (square blue light source image) formed on the exit plane of light guide rod 102 is focused on the display plane (panel plane) of display element 110 by the illumination lens group composed of illumination lenses 103, 104, 106, and 107.

The non-polarized blue light beam that exits from the exit plane of light guide rod 102 is spatially split into a plurality of light beams by illumination lenses 103 and 104. The number of light beams split by illumination lenses 103 and 104 depends on the number of times that the light is reflected during the propagation of light in light guide rod 102.

In FIG. 9 and FIG. 10, the blue light beam of non-polarized light that exits from light guide rod 102 is split into three light beams. Reflection element 105 is arranged such that each of blue light beams split by illumination lenses 103 and 104 is transmitted through any one of reflection members $52_1$ to $52_4$. Each of split blue light beams passes through reflection element 105 without hardly any optical loss due to shielding caused by reflection members $51_1$ to $51_4$.

Each of split blue light beams that have passed through reflection element 105 is superimposed by illumination lenses 106 and 107 and then reaches reflective polarization plate 109 through phase plate 108.

Although first linearly polarized light (for example, P polarized light), of light beams (non-polarized light) that have been passed through phase plate 108, is transmitted through reflective polarization plate 109, second linearly polarized light (for example, S polarized light) is reflected by reflective polarization plate 109 in the direction of phase plate 108.

The first linearly polarized light that has been transmitted through reflective polarization plate 109 reaches the display plane (panel plane) of display element 110. Display element 110 is illuminated with the first linearly polarized light of blue light beams superimposed by illumination lenses 106 and 107. As a result, blue illumination light having an equal illuminance distribution can be provided.

On the other hand, the second linearly polarized light (S polarized light) reflected by reflective polarization plate 109 passes through phase plate 108 and then reaches reflection members $51_1$ to $51_4$ of reflection element 105 through illumination lenses 106 and 107. In reflection element 105, the reflected blue light beams (S polarized light) from reflective polarization plate 109 are reflected by any one of reflection members $51_1$ to $51_4$ in the direction of reflective polarization plate 109.

Figure 12:
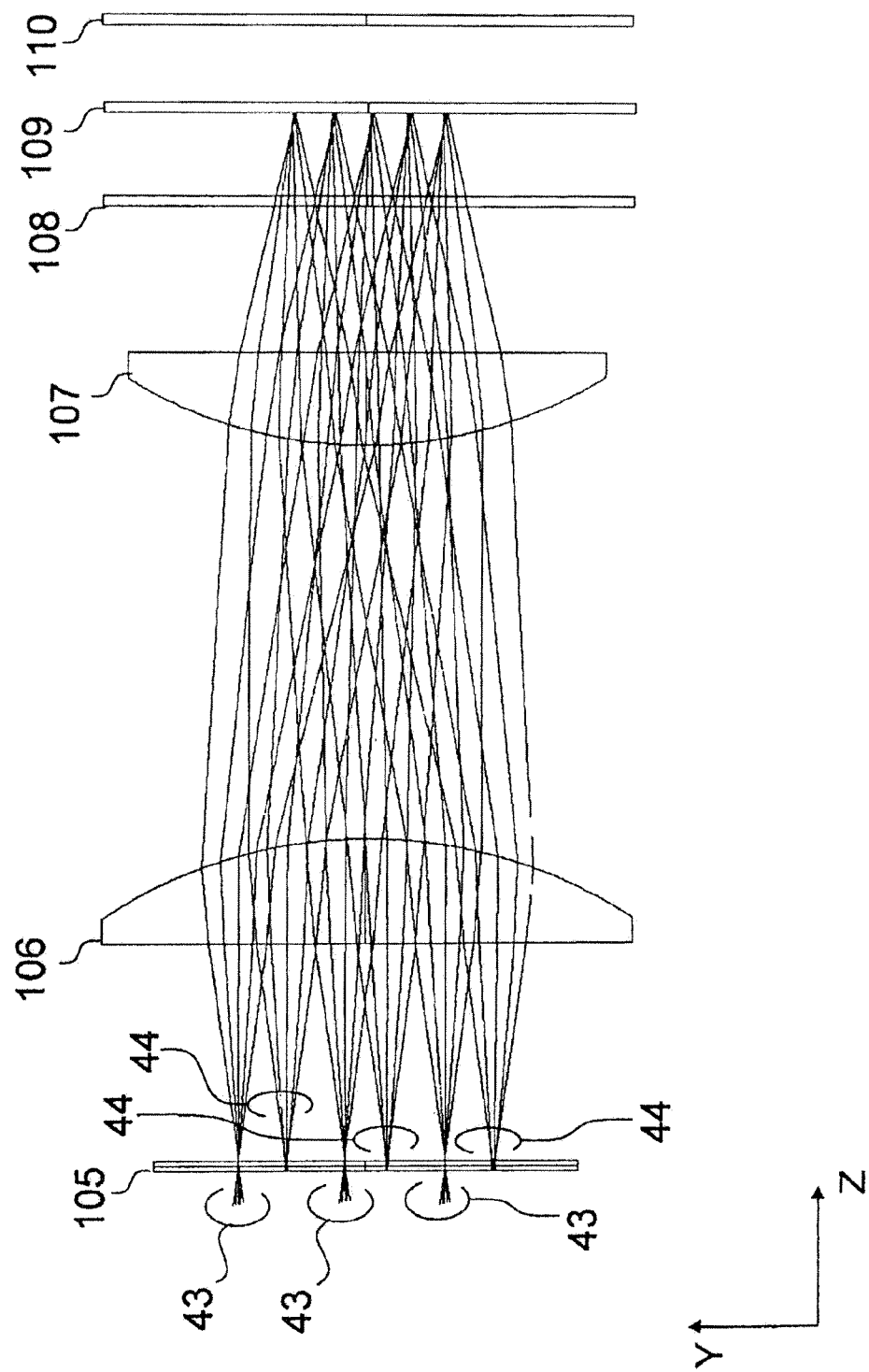
FIG. 12 is a schematic diagram showing a ray tracing result for optical paths after split blue light beams that have been transmitted through the reflection element of the illumination device shown in FIG. 1 are reflected by the reflective polarization plate until the light beams return to the reflection element.

FIG. 12 is a schematic diagram showing a ray tracing result for optical paths after split blue light beams that have been transmitted through reflection element 105 are reflected by reflective polarization plate 109 until the light beams return to reflection element 105. In FIG. 12, blue rays that have been transmitted through particular regions (points) on reflection members $51_1$, $51_2$, and $51_3$ of reflection element 105 shown in FIG. 4A and FIG. 4B are denoted by rays 43. In FIG. 12, the Y axis is a direction perpendicular to optical axis A and corresponds to the vertical direction of images formed on the display plane (panel plane) of display element 110. The Z axis corresponds to a direction along optical axis A.

Blue rays 43 that have passed through reflection element 105 successively pass through illumination lenses 106 and 107 and phase plate 108 and then reach reflective polarization plate 109. Blue rays 43 are non-polarized light when they have just passed through reflection element 105 and after they have passed through phase plate 108.

The first linearly polarized light, of blue rays 43 that have passed through phase plate 108, is transmitted through reflective polarization plate 109, whereas the second linearly polarized light is reflected by reflective polarization plate 109 in the direction of phase plate 108.

The second linearly polarized light of blue rays reflected by reflective polarization plate 109 passes through phase plate 108, becomes circularly polarized light, and then reaches illumination lens 107. Rays (circularly polarized light) from phase plate 108 are condensed by illumination lenses 106 and 107 on reflection members $51_2$, $51_3$, and $51_4$ of reflection element 105 shown in FIG. 4A and FIG. 4B. The condensed rays are rays 44.

When viewed from a direction perpendicular to the incident plane (or exit plane) of reflection element 105 (in the direction of optical axis A), the positions on reflection members $52_1$, $52_2$, and $52_3$ through which rays 43 are transmitted and the positions on reflection members $51_2$, $51_3$, and $51_4$ to which rays 44 are irradiated are point-symmetrical with respect to optical axis A.

In reflection element 105, reflect rays 44 are reflected by reflection members $51_2$, $51_3$, and $51_4$ in the direction of reflective polarization plate 109. Light beams (circularly polarized light) reflected by reflection members $51_2$, $51_3$, and $51_4$ successively pass through illumination lenses 106 and 107 and phase plate 108 and then reach reflective polarization plate 109.

The reflected light beams (circularly polarized light) from reflection element 105 are converted into first polarized light (P polarized light) by phase plate 108. The first polarized light (P polarized light) from phase plate 108 is transmitted through reflective polarization plate 109 and then reaches display element 110.

As shown in FIG. 9 and FIG. 11, the operation of a red light beam emitted from red LED 14 is the same as that of a blue light beam emitted from blue LED 13 as described above.

According to the illumination device of this embodiment, with respect to green, blue, and red light beams that are emitted respectively from green LED 12, blue LED 13, and red LED 14, most of each colored light reflected by reflective polarization plate 109 reaches the corresponding reflection member of reflection element 105. This operation is accomplished when the following first to third conditions are satisfied.

As a first condition, the exit plane of light guide rod 102 and the display plane (panel plane) of display element 110 arranged on both sides (incident side and exit side) of the lens group composed of illumination lenses 103, 104, 106, and 107 needs to be conjugate with each other and also reflective polarization plate 109 needs to be arranged in the neighborhood of the display plane of display element 110.

As a second condition, when viewed from a direction perpendicular to the incident plane of light guide rod 102, the center of emission of each of green LED 12, blue LED 13, and red LED 14 needs to be apart from the center axis of light guide rod 102. More specifically, green, blue, and red light beams emitted respectively from green LED 12, blue LED 13, and red LED 14 need to enter different regions of a plurality of regions segmented by two orthogonal straight lines that pass through the center (median point) of the incident plane of light guide rod 102.

As a third condition, reflection element 105 needs to be arranged at a position where green, blue, and red light beams emitted from green LED 12, blue LED 13, and red LED 14 are spatially split. More specifically, when viewed from a direction perpendicular to the incident plane of light guide rod 102, first reflection members that transmit part of green, blue, and red light beams and that reflect the remaining color light beams and second reflection members that reflect the part of color light beams and that transmit the remaining color light beams need to be alternately arranged in a direction of a straight line (for example, the Y axis of FIG. 3B) that segments the incident plane.

When these conditions are satisfied, most of color light beams reflected by reflective polarization plate 109 can be reflected in the direction of reflective polarization plate 109 by corresponding reflection members of reflection element 105 so as to reuse them. As a result, the light use efficiency can be improved.

Since reflection members $51_1$ to $51_4$ and reflection members $52_1$ to $52_4$ of reflection element 105 can be easily formed by vapor deposition treatment, the reflection members can be easily formed at a pitch of around 1 mm. Thus, unlike an illumination device that uses a PBS polarized light conversion array that cannot be miniaturized, an illumination device having the foregoing structure can be miniaturized.

Since reflection members $51_1$ to $51_4$ that reflect red and blue light beams are arranged at positions that do not correspond to split red and blue light beams spatially split by illumination lenses 103 and 104, most of red and blue light beams path through reflection element 105. Likewise, since reflection members $52_1$ to $52_4$ that reflect green light beams are arranged at positions that do not correspond to green light beams spatially split by illumination lenses 103 and 104, most of split green light beams pass through reflection element 105. Thus, light use efficiency can be further improved.

Although the reflection members of reflection element 105 shown in FIG. 4 are formed in a stripe shape, they may be formed in a non-stripe shape. Further alternatively, the reflection members may be formed only in regions where a plurality of optical color images (imaginary images) are formed on reflective polarization plate 109 (images corresponding to individual color images on the exit plane of light guide rod 102) by second polarized light.

Alternatively, reflection element 105 may be arranged at any position in the illumination lens group as long as reflection element 105 transmits color light beams that have passed through light guide rod 102 and reflects at least part of color light beams reflected by reflective polarization plate 109 in the direction of reflective polarization plate 109. Note, however, that the ratio of the amount of light that passes through reflective polarization plate 109 to the amount of light that is returned to reflective polarization plate 109 may decrease and thereby the effect of light use efficiency may be halved depending on the position of reflection element 105.

Light source 101 may be a light source other than LEDs. For example, an arc discharge lamp may be used as light source 101. In this case, a condenser lens is used to cause light that is emitted from the lamp to enter the incident plane of light guide rod 102.

The illumination optical system includes four illumination lenses 103, 104, 106, and 107. Alternatively, the illumination optical system may have any structure as long as the illumination lens group of the illumination optical system can focus optical images formed on the exit plane of light guide rod 102 on the display plane of display element 110, spatially split the light beams that have passed through the exit plane of light guide rod 102, and return light beams reflected by reflective polarization plate 109 to regions that do not correspond to the split light beams. The illumination optical system may include other optical members as well as light guide rod 102 and illumination lenses 103, 104, 106, and 107.

Light source 101 has the structure shown in FIG. 2 (the red LED, green LED, and blue LED are formed on the same substrate). Alternatively, the red LED, green LED, and blue LED may be formed on different substrates and light beams that have passed through the individual substrates may be caused to enter light guide rod 102.

Figure 13:
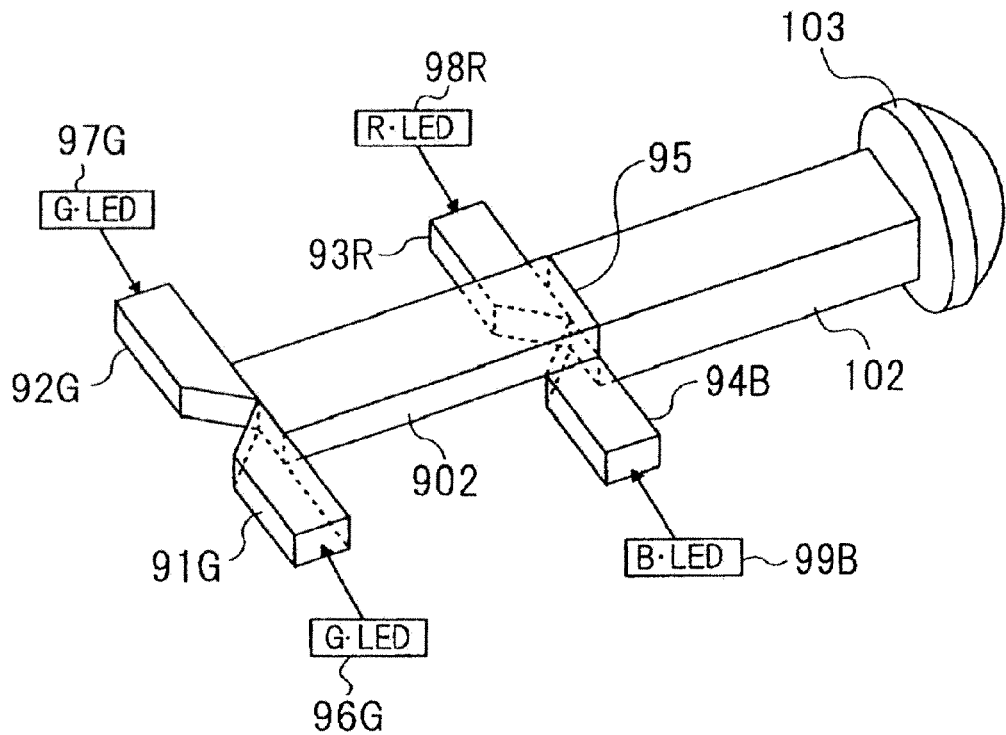
FIG. 13 is a schematic diagram showing the structure of illumination device according to another exemplary embodiment of the present invention.

FIG. 13 schematically shows characteristic sections of illumination device according to another embodiment of the present invention in which a red LED, a green LED, and a blue LED are arranged on different substrates.

Referring to FIG. 13, the illumination device is provided with light sources 96G and 97G that have a peak wavelength in a green wavelength band; light source 98R that has a peak wavelength in a red wavelength band; and light source 99B that has a peak wavelength in a blue wavelength band. These light sources are solid state light sources (for example, LEDs).

Light emitted from light source 96G enters one plane (incident plane) of light guide rod 91G, whereas light emitted from light source 97G enters one plane (incident plane) of light guide rod 92G. Light guide rods 91G and 92G are made of a rectangular parallelepiped-shaped rod member and a right-angled prism member. One of two planes that form a right angle of the right-angled prism member is optically connected to the opposite plane of the incident plane of the rod member and the other plane that forms the right angle is optically connected to one plane (incident plane) of light guide rod 902. In this context, "optically connected" means that such optical members are connected so that most of light emitted from a plane of one optical member enters a plane of the other optical member.

The other plane (exit plane) of light guide rod 902 is optically connected to regions 1 and 2 of the incident plane of light guide rod 102 shown in FIG. 3B.

Light emitted from light source 98R enters one plane (incident plane) of light guide rod 93R, whereas light emitted from light source 98B enters one plane (incident plane) of light guide rod 94B. Likewise, light guide rods 93R and 94B are made of a rectangular parallelepiped-shaped rod member and a right-angled prism member.

In light guide rod 93R, one of two planes that form a right angle of the right-angled prism member is optically connected the opposite plane of the incident plane of the rod member and the other plane that forms the right angle is optically connected to region 4 on the incident plane of light guide rod 102 shown in FIG. 3B.

In light guide rod 94B, one of two planes that form a right angle of the right-angled prism member is optically connected to the opposite plane of the incident plane of the rod member and the other plane that forms the right angle is optically connected to region 4 on the incident plane of light guide rod 102 shown in FIG. 3B.

Likewise, the illumination device according to this embodiment having the structure shown in FIG. 13 has the same action and effect as does the foregoing embodiment.

The illumination device according to each of the foregoing embodiments is just an example and therefore the structure may be appropriately changed. For example, light source 101 uses three LEDs of red, green, and blue LEDs. Alternatively, light source 101 may use a plurality of solid state light sources that emit light beams having different wavelengths (for example, LEDs).

Next, illumination device that uses four LEDs of red, green, blue, and yellow LEDs will be described.

Figure 14:
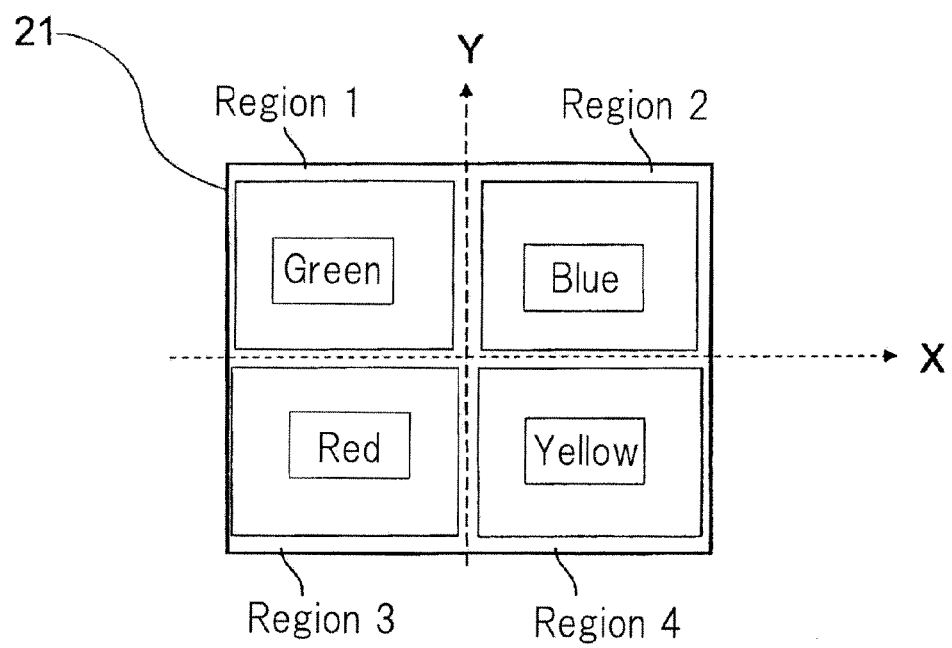
FIG. 14 is a schematic diagram showing the relationship between a red LED, a green LED, a blue LED, a yellow LED, and individual regions of an incident plane of a light guide rod of illumination device according to another embodiment of the present invention.

FIG. 14 schematically shows the relationship between a red LED, a green LED, a blue LED, a yellow LED, and individual regions of incident plane 21 of light guide rod 102. As shown in FIG. 14, light emitted from the green LED enters region 1; light emitted from the blue LED enters region 2; light emitted from the red LED enters region 3; and light emitted from the yellow LED enters region 4.

Figure 15:
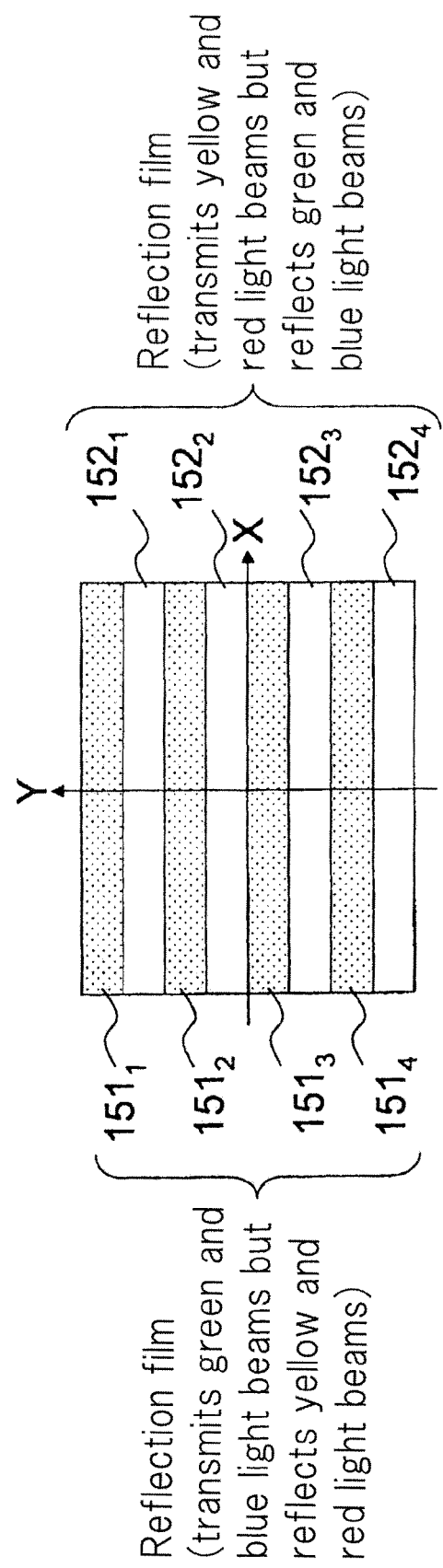
FIG. 15 is a plan view showing a reflection element of the illumination device having the structure shown in FIG. 14.

FIG. 15 is a plan view showing reflection element 105. Referring to FIG. 15, reflection element 105 is composed of a plurality of stripe-shaped reflection members $151_1$ to $151_4$ and $152_1$ to $152_4$ that are formed on glass substrate 50 having a thickness of around 1 mm by aluminum vapor deposition treatment. Reflection members $151_1$ to $151_4$ and $152_1$ to $152_4$ may be dielectric polymers.

Individual green and blue light beams that exit from the exit plane of light guide rod 102 are spatially split by illumination lenses 103 and 104 and then the split light beams enter reflection members $151_1$ to $151_4$. Individual red and yellow light beams that exit from the exit plane of light guide rod 102 are spatially split by illumination lenses 103 and 104 and then the split light beams enter reflection members $152_1$ to $152_4$.

Reflection members $151_1$ to $151_4$ have characteristics in which they transmit light of green and blue wavelength bands and reflect light of yellow and red wavelength bands. In contrast, reflection members $152_1$ to $152_4$ have characteristics in which they transmit light of yellow and red wavelength bands and reflect light of green and blue wavelength bands.

When the structure shown in FIG. 14 and FIG. 15 is applied to the illumination device shown in FIG. 1, it operates as follows.

A green light beam of non-polarized light that exits from the exit plane of light guide rod 102 is spatially split into a plurality of light beams by illumination lenses 103 and 104. Likewise, a blue light beam of non-polarized light that exits from the exit plane of light guide rod 102 is spatially split into a plurality of light beams by illumination lenses 103 and 104. Each of these split green and blue light beams passes through reflection members $151_2$ to $151_4$ of reflection element 105 and reaches reflective polarization plate 109 through the optical paths shown in FIG. 7.

The first linearly polarized light that has been transmitted through reflective polarization plate 109 reaches the display plane (panel plane) of display element 110. Display element 110 is illuminated with the first linearly polarized light of the superimposed green and blue light beams of split green and blue light beams superimposed by illumination lenses 106 and 107. As a result, green and blue illumination light beams h an equal illuminance distribution can be provided.

On the other hand, the second linearly polarized light (S polarized light) of green and blue light beams reflected by reflective polarization plate 109 reaches reflection members $152_1$ to $152_3$ of reflection element 105 through the optical paths shown in FIG. 8. Reflection members $152_1$ to $152_3$ of reflection element 105 reflect the green and blue light beams (S polarized light) that have passed through reflective polarization plate 109 in the direction of reflective polarization plate 109.

Green and blue light beams (circularly polarized light) reflected by reflection members $152_1$ to $152_3$ successively pass through illumination lenses 106 and 107 and phase plate 108 and reach reflective polarization plate 109.

Light beams (circularly polarized light) reflected by reflection element 105 are converted into first polarized light (P polarized light) by phase plate 108. The first polarized light (P polarized light) that has passed through phase plate 108 is transmitted through reflective polarization plate 109 and reaches display element 110.

A red light beam of non-polarized light that exits from the exit plane of light guide rod 102 is spatially split into a plurality of light beams by illumination lenses 103 and 104. Likewise, a yellow light beam of non-polarized light that exits from the exit plane of light guide rod 102 is spatially split into a plurality of light beams by illumination lenses 103 and 104. Each of these split red and yellow light beams passes through reflection members 152₁ to 152₃ of reflection element 105 and reaches reflective polarization plate 109 through the optical paths shown in FIG. 9.

The first linearly polarized light that has been transmitted through reflective polarization plate 109 reaches the display plane (panel plane) of display element 110. Display element 110 is illuminated with the first linearly polarized light of the superimposed red and yellow light beams of split red and yellow light beams superimposed by illumination lenses 106 and 107. As a result, red and yellow illumination light beams having an equal illuminance distribution can be provided.

On the other hand, the second linearly polarized light (S polarized light) of red and yellow light beams reflected by reflective polarization plate 109 reaches reflection members 151₂ to 151₄ of reflection element 105 through the optical paths shown in FIG. 12. Reflection members 151₂ to 151₄ of reflection element 105 reflect the red and yellow light beams (S polarized light) that have passed through reflective polarization plate 109 in the direction of reflective polarization plate 109.

Red and yellow light beams (circularly polarized light) reflected by reflection members 151₂ to 151₄ successively pass through illumination lenses 106 and 107 and phase plate 108 and reach reflective polarization plate 109.

Light beams (circularly polarized light) reflected by reflection element 105 are converted into first polarized light (P polarized light) by phase plate 108. The first polarized light (P polarized light) that has passed through phase plate 108 is transmitted through reflective polarization plate 109 and reaches display element 110.

When the illumination device according to this embodiment is operated as described above, it has the same action and effect as does each of the foregoing embodiments. In addition, when a yellow light beam is added to red, green, and blue light beams, the illumination device can provide illumination light with higher color reproducibility than does each of the foregoing embodiments.

Alternatively, a bluish green LED may be used instead of a yellow LED in the structure shown in FIG. 14 and FIG. 15. In this case, in FIG. 14, light emitted from the green LED enters region 1; light emitted from the bluish green LED enters region 2; light emitted from the red LED enters region 3; and light emitted from the blue LED enters region 4. In FIG. 15, reflection members 151₁ to 151₄ have characteristics in which they transmit green and bluish green light beams and reflect red and blue light beams, whereas reflection members 152₁ to 152₄ have characteristics in which they transmit red and blue light beams and reflect green and bluish green light beams.

The yellow LED and bluish green LED can be easily produced by the combination of a white LED and a phosphor.

Other light guide rods may be arranged such that light beams emitted from a red LED, a green LED, a blue LED, and a yellow LED (or a bluish green LED) enter corresponding regions of incident plane 21 of light guide rod 102. Specifically, these light guide rods may have a first light guide rod that causes a red light beam emitted from the red LED to enter region 3; a second light guide rod that causes a green light beam emitted from the green LED to enter region 1; a third light guide rod that causes a blue light beam emitted from the blue LED to enter region 2; and a fourth light guide rod that causes a yellow (or bluish green) light beam emitted from the yellow LED (or bluish green LED) to enter region 4.

The illumination device according to each of the foregoing embodiments uses a light source having three colors of red, green, and blue or a light source having four colors of red, green, blue, and yellow (or bluish green). Alternatively, the illumination device may use a light source of another type as long as it emits light beams of two or more colors. When a light source having two colors is used, incident plane 21 of light guide rod 102 needs to have two regions segmented by a straight line that passes through the median point of incident plane 21 such that a first color light beam enters one region (regions 1 and 2 of FIG. 3B) and a second light beam enters the other region (regions 3 and 4 of FIG. 3B). In addition, reflection members 51₁ to 51₄ shown in FIG. 4A need to have characteristics in which they transmit the first color light beam and reflect the second color light beam and reflection members 52₁ to 52₄ need to have characteristics in which they transmit the second color light beam and reflect the first color light beam.

As described above, an illumination device according to one aspect of the present invention includes: a light source that emits a plurality of color light beams; an illumination optical system that spatially splits each of the plurality of color light beams emitted from the light source, superimposes the split light beams of each of plurality of color light beams, and emits the superimposed light beams to a display element; a reflective polarization plate that is arranged between the illumination optical system and the display element and transmits first polarized light and that reflects second polarized light whose polarization state is different from that of the first polarized light toward the illumination optical system; a reflection element that is arranged at a position where each of the plurality of color light beams is spatially split by the illumination optical system and transmits the split light beams of each of the color light beams are transmitted and that reflects, of the split light beams of each of the color light beams that have been transmitted through the reflective polarization plate, each color light beam reflected by the reflective polarization plate toward the reflective polarization plate; and a phase plate arranged between the reflection element and the reflective polarization plate. The reflection element includes a first reflection member that transmits part of color light beams of the plurality of color light beams and that reflects other than the transmitted part of color light beams; and a second reflection member that reflects the part of color light beams and transmits other than the transmitted part of color light beams.

When the illumination device has the foregoing structure, most of individual color light beams reflected by the reflective polarization plate can be reflected in the direction of the reflective polarization plate by the first and second reflection members of the reflection element so as to reuse them. As a result, light use efficiency can be improved.

The first and second reflection members of the reflection element can be easily produced by a vapor deposition treatment. Thus, the first and second reflection members can be easily formed at a pitch of around 1 mm. As a result, unlike an illumination device that uses a PBS polarized light conversion array that cannot be easily miniaturized, an illumination device that has the foregoing structure can be miniaturized.

Next, the structure of a projection type display device using illumination device according to the present invention will be described.

Figure 16:
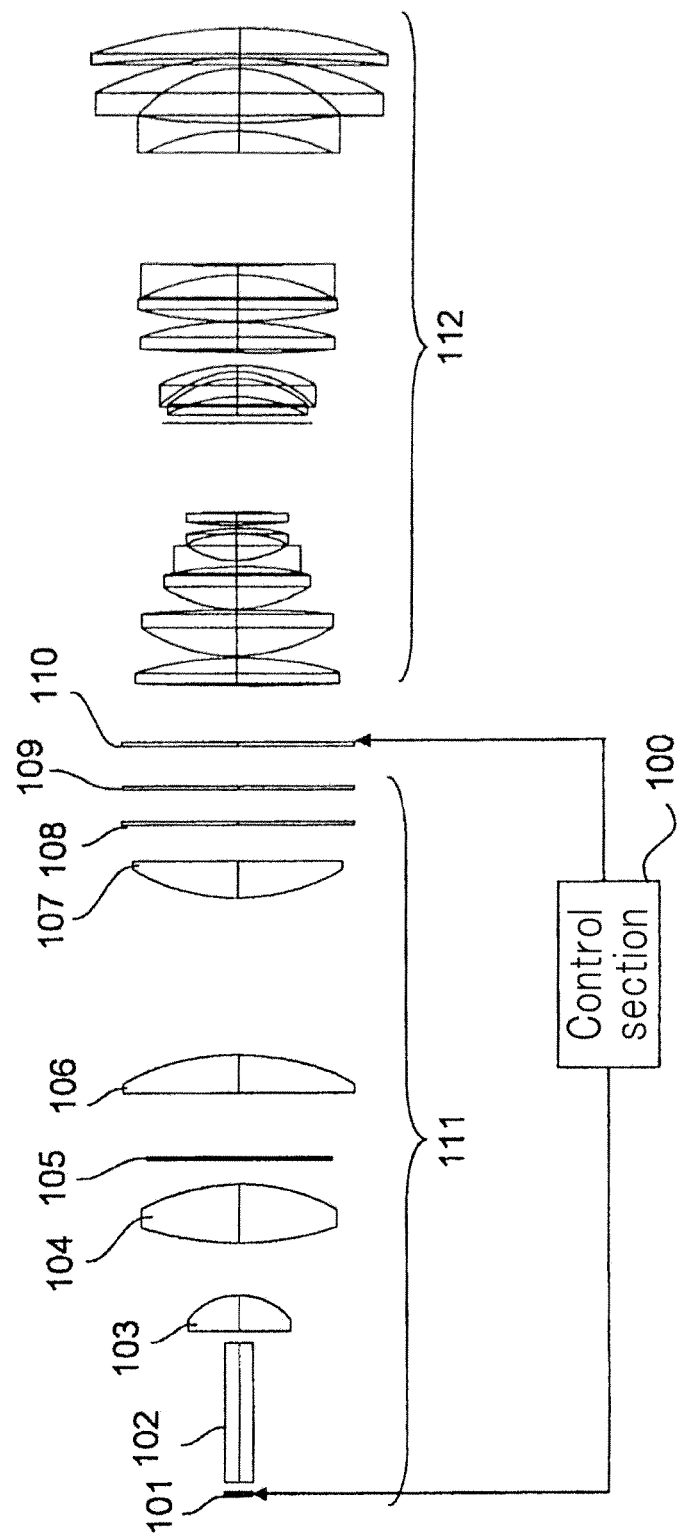
FIG. 16 is a schematic diagram showing the structure of projection type display device having the illumination device according to the present invention.

FIG. 16 is a schematic diagram showing the structure of a projection type display device having illumination device according to the present invention.

The projection type display device shown in FIG. 16 is a single plate type liquid crystal projector. The projector includes control section 100, display element 110, illumination device 111, and projection optical system 112 as principal sections.

Illumination device 111 has the structure of one of the foregoing embodiments. Display element 110 is provided with a liquid crystal panel such as a transmission type TN liquid crystal panel or an LCoS panel. Color light beams (red, green, and blue) of predetermined polarized light (P polarized light or S polarized light) that are output from illumination device 111 are emitted to the liquid crystal panel.

Control section 100 controls light source 101 of illumination device 111 and the liquid crystal panel of display element 110 based on image signals (red, green, and blue) supplied from an external image supply device so as to display red, green, and blue images on a time division basis. For example, when light source 101 is provided with green LED 12, blue LED 13, and red LED 14 shown in FIG. 2, control section 100 turns on red LED 14 to display a red color image on the liquid crystal panel during a red color image display period; turns on green LED 12 to display a green color image on the liquid crystal panel during a green image display period; and turns on blue LED 13 to display a blue color image on the liquid crystal panel during a blue image display period.

Projection optical system 112 projects images (red, green, and blue) displayed by display element 110 on a screen (not shown). The pupil of projection optical system 112 lies at the focal position of the optical system (illumination lenses 103, 104, 106, and 107 shown in FIG. 1) of illumination device 111. In other words, the optical system of illumination device 111 and projection optical system 112 form a telecentric system.

Since the illumination device of the projection type display device according to this embodiment emits high efficient illumination light to the liquid crystal panel, the projection type display device can provide bright projection images.

Alternatively, the foregoing projection type display device may use an illumination device according to another embodiment of the present invention as illumination device 111.

Alternatively, illumination device 111 may be an illumination device having color LEDs of red, green, blue, and yellow as shown in FIG. 14 and FIG. 15. In this case, control section 100 may control light source 101 to turn on both the green LED and yellow LED simultaneously during the green color image display period. Likewise, control section 100 may control light source 101 to turn on both the red LED and yellow LED simultaneously during the red color image display period. Likewise, control section 100 may control light source 101 to turn on both green LED and yellow LED simultaneously during the green color image display period and turn on both the red LED and yellow LED simultaneously during the red color image display period.

Alternatively, illumination device 111 may be an illumination device having color LEDs of red, green, blue, and bluish green. In this case, control section 100 may control light source 101 to turn on both the green LED and the blue LED simultaneously during the green image display period. Likewise, control section 100 may control light source 101 to turn on both the blue LED and bluish green LED simultaneously during the blue color image display period. Likewise, control section 100 may control light source 101 to turn on both the blue LED and bluish green LED simultaneously during the green color image display period and to turn on both the blue LED and the bluish green LED during the blue color image display period.

According to each of the foregoing embodiments, the illumination device can emit white light containing red, green and blue (or white light containing red, green, blue, and yellow or white light containing red, green, blue, and bluish green). Thus, when the liquid crystal panel of display element 110 is composed of pixels having color filters of red, green, and blue, the illumination device can emit full color light beams. In this case, control section 100 turns on all color LEDs of light source 101 and turns on/off individual pixels of red, green, and blue on a time division basis.

The above described illumination device and projection type display device are examples of the present invention. However, it should be understood by those skilled in the art that the structure of the present invention may be changed in various manners without departing from the scope of the present invention.

The invention claimed is:

1. An illumination device comprising:
a light source that emits a plurality of color light beams;
an illumination optical system that spatially splits each of said plurality of color light beams emitted from said light source, superimposes the split light beams of each of said plurality of color light beams, and emits the superimposed light beams to a display element;
a reflective polarization plate that is arranged between said illumination optical system and said display element and that transmits first polarized light and that reflects second polarized light whose polarization state is different from that of said first polarized light toward a said illumination optical system;
a reflection element that is arranged at a position where each of said plurality of color light beams is spatially split by said illumination optical system and that transmits the split light beams of each of said color light beams and that reflects, of the split light beams of each of said color light beams that have been transmitted through said reflective polarization plate, each color light beam reflected by said reflective polarization plate toward said reflective polarization plate; and
a phase plate arranged between said reflection element and said reflective polarization plate,
wherein said reflection element includes:
a first reflection member that transmits part of color light beams of said plurality of color light beams and that reflects other than the transmitted part of color light beams; and
a second reflection member that reflects said part of color light beams and transmits other than said transmitted part of color light beams,
wherein said light source includes:
a first solid state light source having a peak wavelength in a red wavelength band;
a second solid state light source having a peak wavelength in a green wavelength band; and
a third solid state light source having a peak wavelength in a blue wavelength band,
wherein said first reflection member transmits light of said green wavelength band and reflects light of said red and blue wavelength bands, and
wherein said second reflection member reflects light of said green wavelength band and transmits light of said red and blue wavelength bands, and
wherein said illumination optical system includes a light guide unit where said plurality of color light beams emitted from said light source are supplied to one end surface, and said plurality of color light beams that have entered from the one end surface are propagated inside to exit from the other end surface,
wherein the one end surface of said light guide unit includes first to fourth regions segmented by a first straight line and a second straight line that pass through a median point of the one end surface and that are orthogonal to each other,
wherein a green light beam emitted from said second solid state light source enters said first and second regions that are adjacent to each other via said first straight line represented as a boundary of said first and second regions, wherein a red light beam emitted from said first solid state light source enters said third region, wherein a blue light beam emitted from said third solid state light source enters said fourth region, and wherein said first and second reflection members are alternately arranged in a direction along said first straight line when viewed from a direction perpendicular to said first plane of said light guide unit.

2. The illumination device as set forth in claim 1, further comprising:
   a first light guide unit that causes the red light beam emitted from said first solid state light source to enter said third region;
   a second light guide unit that causes the green light beam emitted from said second solid state light source to enter said first and second regions; and
   a third light guide unit that causes the blue light beam emitted from said third solid state light source to enter said fourth region.

3. An illumination device comprising:
   a light source that emits a plurality of color light beams;
   an illumination optical system that spatially splits each of said plurality of color light beams emitted from said light source, superimposes the split light beams of each of said plurality of color light beams, and emits the superimposed light beams to a display element;
   a reflective polarization plate that is arranged between said illumination optical system and said display element and that transmits first polarized light and that reflects second polarized light whose polarization state is different from that of said first polarized light toward a said illumination optical system;
   a reflection element that is arranged at a position where each of said plurality of color light beams is spatially split by said illumination optical system and that transmits the split light beams of each of said color light beams and that reflects, of the split light beams of each of said color light beams that have been transmitted through said reflective polarization plate, each color light beam reflected by said reflective polarization plate toward said reflective polarization plate; and
   a phase plate arranged between said reflection element and said reflective polarization plate,
   wherein said reflection element includes:
   a first reflection member that transmits part of color light beams of said plurality of color light beams and that reflects other than the transmitted part of color light beams; and
   a second reflection member that reflects said part of color light beams and transmits other than said transmitted part of color light beams, and
   wherein said light source includes:
   a first solid state light source having a peak wavelength in a red wavelength band;
   a second solid state light source having a peak wavelength in a green wavelength band;
   a third solid state light source having a peak wavelength in a blue wavelength band, and
   a fourth solid state light source having a peak wavelength in a yellow wavelength band,
   wherein said first reflection member transmits light of said green and blue wavelength bands and reflects light of said red and yellow wavelength bands, and
   wherein said second reflection member reflects light of said green and blue wavelength bands and transmits light of said red and yellow wavelength bands.

4. The illumination device as set forth in claim 3,
   wherein said illumination optical system includes a light guide unit where said plurality of color light beams emitted from said light source are supplied to one end surface, and said plurality of color light beams that have entered from the one end surface are propagated inside to exit from the other end surface,
   wherein the one end surface of said light guide unit includes first to fourth regions segmented by a first straight line and a second straight line that pass through a median point of the one end surface and that are orthogonal to each other,
   wherein a red light beam emitted from said first solid state light source enters said third region,
   wherein a green light beam emitted from said second solid state light source enters said first region,
   wherein a blue light beam emitted from said third solid state light source enters said second region,
   wherein a yellow light beam emitted from said fourth solid state light source enters said fourth region, and
   wherein said first and second reflection members are alternately arranged in a direction along said first straight line that represents a boundary of said first or third region and said second or fourth region when viewed from a direction perpendicular to said first plane of said light guide unit.

5. The illumination device as set forth in claim 4, further comprising:
   a first light guide unit that causes the red light beam emitted from said first solid state light source to enter said third region;
   a second light guide unit that causes the green light beam emitted from said second solid state light source to enter said first region;
   a third light guide unit that causes the blue light beam emitted from said third solid state light source to enter said second region; and
   a fourth light guide unit that causes the yellow light beam emitted from said fourth solid state light source to enter said fourth region.

6. A projection type display device, comprising:
   an illumination device;
   a display element illuminated with light emitted from said illumination device; and
   a projection optical system that projects image light that is output from said display element,
   wherein said illumination device, includes:
   a light source that emits a plurality of color light beams;
   an illumination optical system that spatially splits each of said plurality of color light beams emitted from said light source, superimposes the split light beams of each of said plurality of color light beams, and emits the superimposed light beams to a display element;
   a reflective polarization plate that is arranged between said illumination optical system and said display element and that transmits first polarized light and that reflects second polarized light whose polarization state is different from that of said first polarized light toward a said illumination optical system;
   a reflection element that is arranged at a position where each of said plurality of color light beams is spatially split by said illumination optical system and that transmits the split light beams of each of said color light beams and that reflects, of the split light beams of each of said color light beams that have been transmitted through said reflective polarization plate, each color light beam reflected by said reflective polarization plate toward said reflective polarization plate; and a phase plate arranged between said reflection element and said reflective polarization plate, wherein said reflection element includes:

a first reflection member that transmits part of color light beams of said plurality of color light beams and that reflects other than the transmitted part of color light beams; and a second reflection member that reflects said part of color light beams and transmits other than said transmitted part of color light beams, wherein said light source includes:

a first solid state light source having a peak wavelength in a red wavelength band;

a second solid state light source having a peak wavelength in a green wavelength band;

a third solid state light source having a peak wavelength in a blue wavelength band, and a fourth solid state light source having a peak wavelength in a yellow wavelength band, wherein said first reflection member transmits light of said green and blue wavelength bands and reflects light of said red and yellow wavelength bands, and wherein said second reflection member reflects light of said green and blue wavelength bands and transmits light of said red and yellow wavelength bands.

* * * * *